(12) United States Patent
Lee et al.

(10) Patent No.: US 11,930,384 B2
(45) Date of Patent: Mar. 12, 2024

(54) METHOD AND APPARATUS FOR TRANSMITTING/RECEIVING WIRELESS SIGNAL IN WIRELESS COMMUNICATION SYSTEM

(71) Applicant: LG ELECTRONICS INC., Seoul (KR)

(72) Inventors: Youngdae Lee, Seoul (KR); Jaehyung Kim, Seoul (KR); Suckchel Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 246 days.

(21) Appl. No.: 17/451,140

(22) Filed: Oct. 15, 2021

(65) Prior Publication Data

US 2022/0124526 A1 Apr. 21, 2022

(30) Foreign Application Priority Data

Oct. 16, 2020 (KR) .......... 10-2020-0134115

(51) Int. Cl.
| | |
|---|---|
| *H04W 24/08* | (2009.01) |
| *H04W 24/10* | (2009.01) |
| *H04W 36/00* | (2009.01) |
| *H04W 36/30* | (2009.01) |
| *H04W 36/32* | (2009.01) |

(Continued)

(52) U.S. Cl.
CPC .......... *H04W 24/10* (2013.01); *H04W 24/08* (2013.01); *H04W 36/0058* (2018.08); *H04W 36/0061* (2013.01); *H04W 36/0072* (2013.01); *H04W 36/0094* (2013.01); *H04W 36/30* (2013.01); *H04W 36/324* (2023.05); *H04W 56/0015* (2013.01); *H04W 56/002* (2013.01);

*H04W 72/046* (2013.01); *H04W 72/542* (2023.01); *H04W 84/02* (2013.01); *H04W 88/02* (2013.01);

(Continued)

(58) Field of Classification Search
CPC ... H04B 7/02–12; H04B 17/0082–3913; H04J 11/0023–0093; H04J 2011/0003–0096; H04L 5/0001–0098; H04W 8/22–245; H04W 24/02–10; H04W 28/02–26; H04W 36/0005–385; H04W 48/02–20; H04W 56/0005–0095; H04W 60/005–06; H04W 64/003–006; H04W 72/02–569; H04W 74/002–0891; H04W 76/10–50; H04W 84/02–16; H04W 88/02–12; H04W 92/02–04; H04W 92/10

See application file for complete search history.

(56) References Cited

U.S. PATENT DOCUMENTS

| | | | |
|---|---|---|---|
| 2020/0068420 A1* | 2/2020 | Chen ...................... | H04W 24/10 |
| 2021/0400589 A1* | 12/2021 | Yiu ........................ | H04W 24/10 |

FOREIGN PATENT DOCUMENTS

WO WO-2021196007 A1 * 10/2021 ............ H04W 24/10

\* cited by examiner

*Primary Examiner* — Timothy J Weidner
(74) *Attorney, Agent, or Firm* — LEE, HONG, DEGERMAN, KANG & WAIMEY

(57) ABSTRACT

Various embodiments relate to a next-generation wireless communication system for supporting higher data transmission rate, beyond a 4th generation (4G) wireless communication system. According to various embodiments, a method of transmitting and receiving a signal in a wireless communication system and an apparatus supporting the same may be provided, and other various embodiments may be provided.

15 Claims, 23 Drawing Sheets

(51) Int. Cl.
*H04W 56/00* (2009.01)
*H04W 72/044* (2023.01)
*H04W 72/542* (2023.01)
*H04W 84/02* (2009.01)
*H04W 88/02* (2009.01)
*H04W 88/08* (2009.01)
*H04W 92/02* (2009.01)
*H04W 92/10* (2009.01)

(52) U.S. Cl.
CPC ............ *H04W 88/08* (2013.01); *H04W 92/02* (2013.01); *H04W 92/10* (2013.01)

FIG. 9

| | | RACH slot (1ms) | | | | | | | | | | | | | |
|---|---|---|---|---|---|---|---|---|---|---|---|---|---|---|---|
| Symbol Index | | 0 | 1 | 2 | 3 | 4 | 5 | 6 | 7 | 8 | 9 | 10 | 11 | 12 | 13 |
| PRACH configuration index | 81 | A1 | A1 | A1 | A1 | A1 | A1 | | | | | | | | |
| | 82 | | | | | | | | | A1 | A1 | A1 | | | |
| | 100 | | | | | | | | | | A2 | | | | |
| | 101 | A2 | | | A2 | | | A2 | | | | | | | |
| | 127 | A3 | | | | | A3 | | | | | | | | |
| | 128 | | | | | | A3 | | | | | | | | |
| | 142 | | B1 | B1 | B1 | B1 | B1 | B1 | | | | | | | |
| | 143 | | | | | | B1 | B1 | B1 | | | | | | |
| | 221 | | A1 | A1 | A1 | A1 | A1 | A1 | | | | | | | |
| | 222 | | | | | | A1 | A1 | A1 | | | | | | |
| | 235 | A2 | | | A2 | | | B2 | | | | | | | |
| | 236 | | | | | A2 | | B2 | | | | | | | |
| | 251 | A3 | | | | | B3 | | | | | | | | |
| | 252 | | | A3 | | | | B3 | | | | | | | |

METHOD AND APPARATUS FOR TRANSMITTING/RECEIVING WIRELESS SIGNAL IN WIRELESS COMMUNICATION SYSTEM

CROSS-REFERENCE TO RELATED APPLICATIONS

Pursuant to 35 U.S.C. § 119(a), this application claims the benefit of earlier filing date and right of priority to Korean Patent Application No. 10-2020-0134115, filed on Oct. 16, 2020, the contents of which are hereby incorporated by reference herein in its entirety.

TECHNICAL FIELD

The present disclosure relates to a wireless communication system, and more particularly, to a method and apparatus for transmitting/receiving a wireless signal.

BACKGROUND

Generally, a wireless communication system is developing to diversely cover a wide range to provide such a communication service as an audio communication service, a data communication service, and the like. The wireless communication is a sort of a multiple access system capable of supporting communications with multiple users by sharing available system resources (e.g., bandwidth, transmit power, etc.). For example, the multiple access system may be any of a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

SUMMARY

An object of the present disclosure is to provide a method of efficiently performing wireless signal transmission/reception procedures and an apparatus therefor.

It will be appreciated by persons skilled in the art that the objects and advantages that could be achieved with the present disclosure are not limited to what has been particularly described hereinabove and the above and other objects and advantages that the present disclosure could achieve will be more clearly understood from the following detailed description.

According to various embodiments, provided herein is a method of transmitting and receiving a signal by a user equipment (UE) in a wireless communication system.

The method includes: transmitting information about a mobility state of the UE; receiving configuration information related to cell measurement; measuring a quality of a serving cell with respect to a plurality of synchronization signal block (SSB) indexes of the serving cell; and performing radio resource management (RRM) measurement or relaxed RRM measurement based on the configuration information and a result of measurement. Performing the relaxed RRM measurement includes skipping performing the RRM measurement for a predetermined time with respect to remaining SSB indexes except for a specific SSB index of the serving cell or skipping the RRM measurement for the predetermined time with respect to a neighboring cell other than the serving cell.

The configuration information includes information about the serving cell, the specific SSB index of the serving cell, the predetermined time, and the neighboring cell.

The measurement quality of the serving cell may be determined as an average of measurement qualities of partial SSB indexes having qualities greater than or equal to a first threshold.

The information about the mobility state of the UE may include one or more SSB indexes having best qualities measured by the serving cell or one or more SSB indexes having qualities greater than or equal to a threshold.

The measurement quality of the serving cell may be determined based on a measurement quality of the specific SSB index of the serving cell, which is greater than or equal to a second threshold.

The method may further include: reporting, to a base station (BS), the measurement quality of the serving cell determined based on the measurement quality of the specific SSB index of the serving cell, which is greater than or equal to the second threshold; and receiving indication information instructing the UE to perform the relaxed RRM measurement from the BS, based on the reporting.

The method may further include: performing the RRM measurement with respect to the remaining SSB indexes of the serving cell, based on a measurement quality of the specific SSB index of the serving cell, which is less than a third threshold; and performing measurement with respect to the neighboring cell other than the serving cell.

Performing the measurement with respect to the neighboring cell may include: performing the RRM measurement with respect to a specific SSB index of the neighboring cell indicated by the BS; and performing the RRM measurement with respect to remaining SSB indexes other than the specific SSB index of the neighboring cell, based on a measurement quality of the specific SSB index of the neighboring cell, which is less than a fourth threshold.

Performing the measurement with respect to the neighboring cell may include: performing the RRM measurement with respect to neighboring cells having the same frequency as the serving cell; and performing the RRM measurement with respect to all neighboring cells regardless of whether the neighboring cells have the same frequency as the serving cell, based on qualities of the neighboring cells which are less than a fifth threshold as the result of measurement.

A non-volatile computer readable medium in which program code for performing the method is recorded may be provided.

According to various embodiments, provided herein is a user equipment (UE) operating in a wireless communication system, including: a transceiver; and one or more processors connected to the transceiver. The one or more processors may be configured to: transmit information about a mobility state of the UE; receive configuration information related to cell measurement; measure a quality of a serving cell with respect to a plurality of synchronization signal block (SSB) indexes of the serving cell; and perform radio resource management (RRM) measurement or relaxed RRM measurement based on the configuration information and a result of measurement. Performing the relaxed RRM measurement by the processor may include skipping performing the RRM measurement for a predetermined time with respect to remaining SSB indexes except for a specific SSB index of the serving cell or skipping the RRM measurement for the predetermined time with respect to neighboring cells other than the serving cell. The configuration information may include information about the serving cell, the specific SSB index of the serving cell, the predetermined time, and the neighboring cell.

According to other aspect of the present disclosure, a non-transitory computer readable medium recorded thereon program codes for performing the aforementioned method is presented.

According to another aspect of the present disclosure, the UE configured to perform the aforementioned method is presented.

According to another aspect of the present disclosure, a device configured to control the UE to perform the aforementioned method is presented.

BRIEF DESCRIPTION OF THE DRAWINGS

FIG. 9 illustrates an example of a RACH occasion defined in one RACH slot in the NR system;

DETAILED DESCRIPTION

Figure 1:
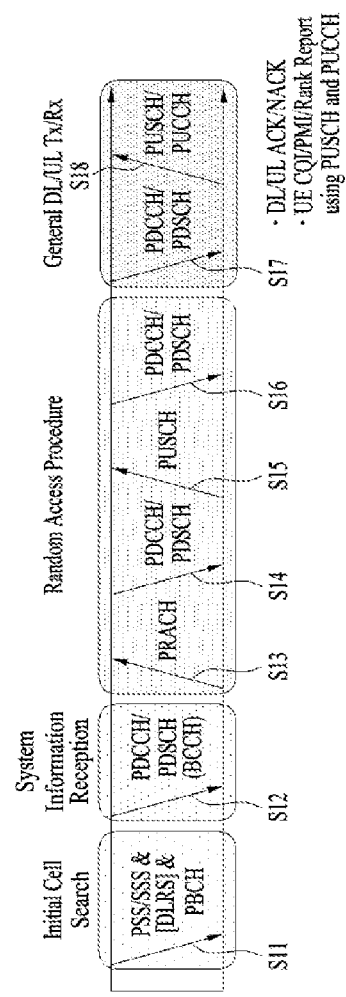
FIG. 1 illustrates physical channels used in a 3rd generation partnership project (3GPP) system, which is an example of wireless communication systems, and a general signal transmission method using the same.

Embodiments of the present disclosure are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

As more and more communication devices require a larger communication capacity, there is a need for mobile broadband communication enhanced over conventional radio access technology (RAT). In addition, massive Machine Type Communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and Ultra-Reliable and Low Latency Communication (URLLC) is being discussed. In the present disclosure, for simplicity, this technology will be referred to as NR (New Radio or New RAT).

For the sake of clarity, 3GPP NR is mainly described, but the technical idea of the present disclosure is not limited thereto.

Details of the background, terminology, abbreviations, etc. used herein may be found in 3GPP standard documents published before the present disclosure.

Following documents are incorporated by reference:
3GPP LTE
TS 36.211: Physical channels and modulation
TS 36.212: Multiplexing and channel coding
TS 36.213: Physical layer procedures
TS 36.300: Overall description
TS 36.321: Medium Access Control (MAC)
TS 36.331: Radio Resource Control (RRC)
3GPP NR
TS 38.211: Physical channels and modulation
TS 38.212: Multiplexing and channel coding
TS 38.213: Physical layer procedures for control
TS 38.214: Physical layer procedures for data
TS 38.300: NR and NG-RAN Overall Description
TS 38.321: Medium Access Control (MAC)
TS 38.331: Radio Resource Control (RRC) protocol specification Abbreviations and Terms PDCCH: Physical Downlink Control CHannel
PDSCH: Physical Downlink Shared CHannel
PUSCH: Physical Uplink Shared CHannel
CSI: Channel state information
RRM: Radio resource management
RLM: Radio link monitoring
DCI: Downlink Control Information
CAP: Channel Access Procedure Ucell: Unlicensed cell
PCell: Primary Cell
PSCell: Primary SCG Cell
TBS: Transport Block Size
SLIV: Starting and Length Indicator Value
BWP: BandWidth Part
CORESET: COntrol REsourse SET
REG: Resource element group
SFI: Slot Format Indicator
COT: Channel occupancy time
SPS: Semi-persistent scheduling
PLMN ID: Public Land Mobile Network identifier
RACH: Random Access Channel
RAR: Random Access Response
Msg3: Message transmitted on UL-SCH containing a C-RNTI MAC CE or CCCH SDU, submitted from upper layer and associated with the UE Contention Resolution Identity, as part of a Random Access procedure.
Special Cell: For Dual Connectivity operation the term Special Cell refers to the PCell of the MCG or the PSCell of the SCG depending on if the MAC entity is associated to the MCG or the SCG, respectively. Otherwise the term Special Cell refers to the PCell. A Special Cell supports PUCCH transmission and contention-based Random Access, and is always activated.
Serving Cell: A PCell, a PSCell, or an SCell In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

FIG. 1 illustrates physical channels used in a 3GPP NR system and a general signal transmission method using the same.

When a UE is powered on again from a power-off state or enters a new cell, the UE performs an initial cell search procedure, such as establishment of synchronization with a BS, in step S101. To this end, the UE receives a synchronization signal block (SSB) from the BS. The SSB includes a primary synchronization signal (PSS), a secondary synchronization signal (SSS), and a physical broadcast channel (PBCH). The UE establishes synchronization with the BS based on the PSS/SSS and acquires information such as a cell identity (ID). The UE may acquire broadcast information in a cell based on the PBCH. The UE may receive a DL reference signal (RS) in an initial cell search procedure to monitor a DL channel status.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
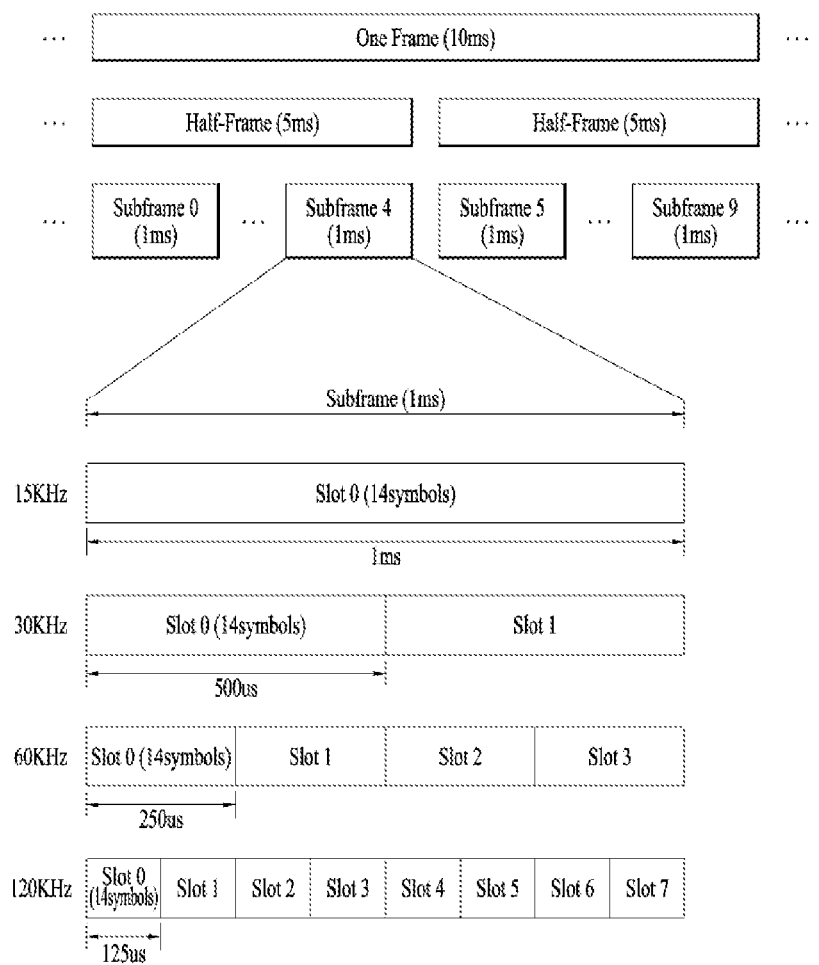
FIG. 2 illustrates a radio frame structure.

FIG. 2 illustrates a radio frame structure. In NR, uplink and downlink transmissions are configured with frames. Each radio frame has a length of 10 ms and is divided into two 5-ms half-frames (HF). Each half-frame is divided into five 1-ms subframes (SFs). A subframe is divided into one or more slots, and the number of slots in a subframe depends on subcarrier spacing (SCS). Each slot includes 12 or 14 Orthogonal Frequency Division Multiplexing (OFDM) symbols according to a cyclic prefix (CP). When a normal CP is used, each slot includes 14 OFDM symbols. When an extended CP is used, each slot includes 12 OFDM symbols.

Table 1 exemplarily shows that the number of symbols per slot, the number of slots per frame, and the number of slots per subframe vary according to the SCS when the normal CP is used.

TABLE 1

| SCS ($15 * 2^u$) | $N^{slot}_{symb}$ | $N^{frame,u}_{slot}$ | $N^{subframe,u}_{slot}$ |
| --- | --- | --- | --- |
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

* $N^{slot}_{symb}$: Number of symbols in a slot
* $N^{frame,u}_{slot}$: Number of slots in a frame
* $N^{subframe,u}_{slot}$: Number of slots in a subframe Table 2 illustrates that the number of symbols per slot, the number of slots per frame, and the number of slots per subframe vary according to the SCS when the extended CP is used.

TABLE 2

| SCS ($15 * 2^u$) | $N^{slot}_{symb}$ | $N^{frame,u}_{slot}$ | $N^{subframe,u}_{slot}$ |
| --- | --- | --- | --- |
| 60 KHz (u = 2) | 12 | 40 | 4 |

The structure of the frame is merely an example. The number of subframes, the number of slots, and the number of symbols in a frame may vary.

In the NR system, OFDM numerology (e.g., SCS) may be configured differently for a plurality of cells aggregated for one UE. Accordingly, the (absolute time) duration of a time resource (e.g., an SF, a slot or a TTI) (for simplicity, referred to as a time unit (TU)) consisting of the same number of symbols may be configured differently among the aggregated cells. Here, the symbols may include an OFDM symbol (or a CP-OFDM symbol) and an SC-FDMA symbol (or a discrete Fourier transform-spread-OFDM (DFT-s-OFDM) symbol).

Figure 3:
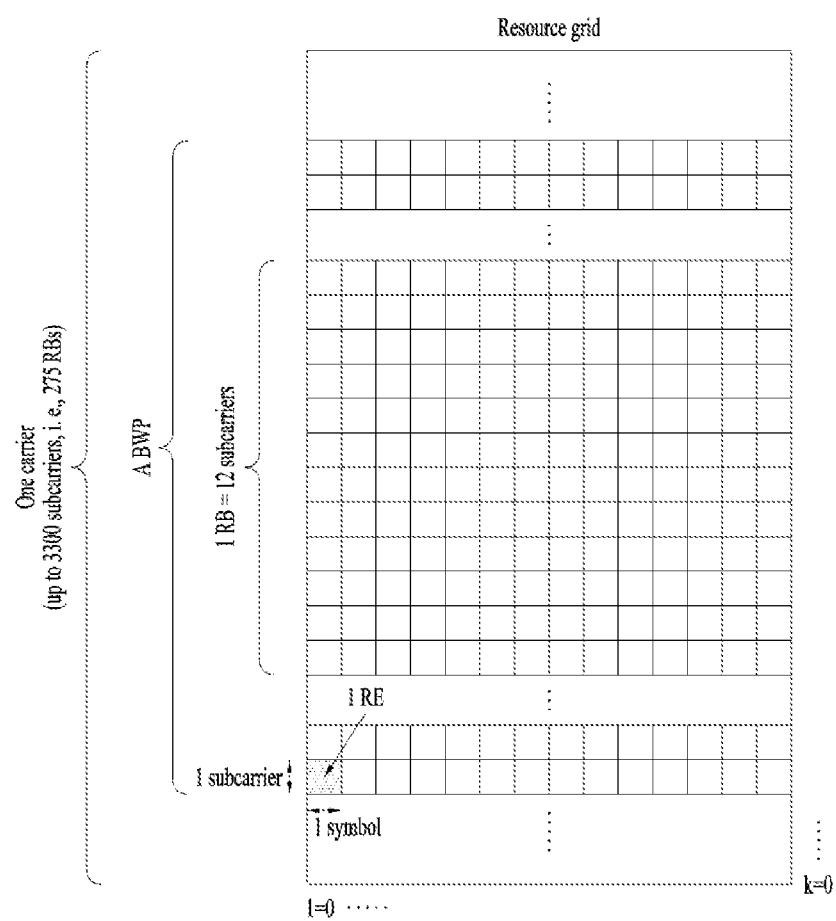
FIG. 3 illustrates a resource grid of a slot.

FIG. 3 illustrates a resource grid of a slot. A slot includes a plurality of symbols in the time domain. For example, when the normal CP is used, the slot includes 14 symbols. However, when the extended CP is used, the slot includes 12 symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) may be defined to be a plurality of consecutive physical RBs (PRBs) in the frequency domain and correspond to a single numerology (e.g., SCS, CP length, etc.). The carrier may include up to N (e.g., 5) BWPs. Data communication may be performed through an activated BWP, and only one BWP may be activated for one UE. In the resource grid, each element is referred to as a resource element (RE), and one complex symbol may be mapped to each RE.

Figure 4:
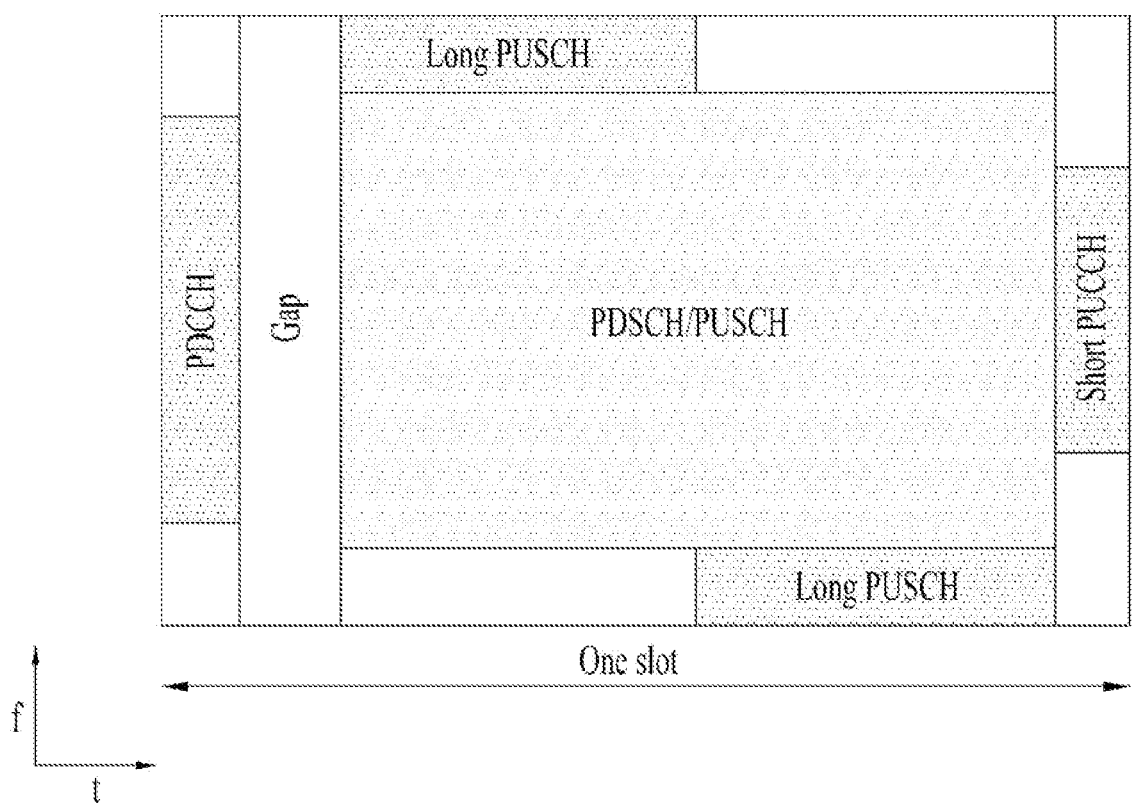
FIG. 4 illustrates exemplary mapping of physical channels in a slot.

FIG. 4 illustrates exemplary mapping of physical channels in a slot. In the NR system, a DL control channel, DL or UL data, and a UL control channel may be included in one slot. For example, the first N symbols (hereinafter, referred to as a DL control region) of a slot may be used to transmit a DL control channel (e.g., PDCCH), and the last M symbols (hereinafter, referred to as a UL control region) of the slot may be used to transmit a UL control channel (e.g., PUCCH). Each of N and M is an integer equal to or larger than 0. A resource region (hereinafter, referred to as a data region) between the DL control region and the UL control region may be used to transmit DL data (e.g., PDSCH) or UL data (e.g., PUSCH). A guard period (GP) provides a time gap for transmission mode-to-reception mode switching or reception mode-to-transmission mode switching at a BS and a UE. Some symbol at the time of DL-to-UL switching in a subframe may be configured as a GP.

The PDCCH delivers DCI. For example, the PDCCH (i.e., DCI) may carry information about a transport format and resource allocation of a DL shared channel (DL-SCH), resource allocation information of an uplink shared channel (UL-SCH), paging information on a paging channel (PCH), system information on the DL-SCH, information on resource allocation of a higher-layer control message such as an RAR transmitted on a PDSCH, a transmit power control command, information about activation/release of configured scheduling, and so on. The DCI includes a cyclic redundancy check (CRC). The CRC is masked with various identifiers (IDs) (e.g. a radio network temporary identifier (RNTI)) according to an owner or usage of the PDCCH. For example, if the PDCCH is for a specific UE, the CRC is masked by a UE ID (e.g., cell-RNTI (C-RNTI)). If the PDCCH is for a paging message, the CRC is masked by a paging-RNTI (P-RNTI). If the PDCCH is for system information (e.g., a system information block (SIB)), the CRC is masked by a system information RNTI (SI-RNTI). When the PDCCH is for an RAR, the CRC is masked by a random access-RNTI (RA-RNTI).

Figure 5:
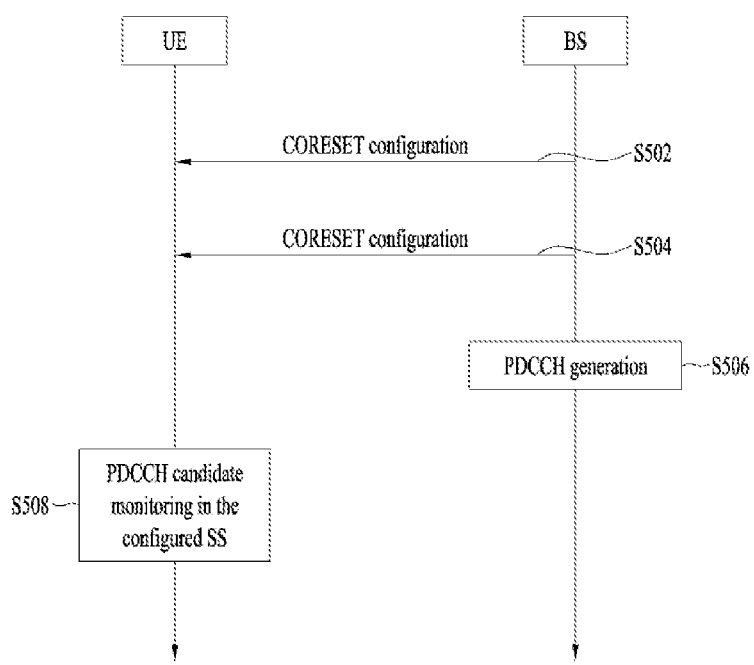
FIG. 5 is a diagram illustrating a signal flow for a physical downlink control channel (PDCCH) transmission and reception process.

FIG. 5 is a diagram illustrating a signal flow for a PDCCH transmission and reception process.

Referring to FIG. 5, a BS may transmit a control resource set (CORESET) configuration to a UE (S502). A CORSET is defined as a resource element group (REG) set having a given numerology (e.g., an SCS, a CP length, and so on). An REG is defined as one OFDM symbol by one (P)RB. A plurality of CORESETs for one UE may overlap with each other in the time/frequency domain. A CORSET may be configured by system information (e.g., a master information block (MIB)) or higher-layer signaling (e.g., radio resource control (RRC) signaling). For example, configuration information about a specific common CORSET (e.g., CORESET #0) may be transmitted in an MIB. For example, a PDSCH carrying system information block 1 (SIB1) may be scheduled by a specific PDCCH, and CORSET #0 may be used to carry the specific PDCCH. Configuration information about CORESET #N (e.g., N>0) may be transmitted by RRC signaling (e.g., cell-common RRC signaling or UE-specific RRC signaling). For example, the UE-specific RRC signaling carrying the CORSET configuration information may include various types of signaling such as an RRC setup message, an RRC reconfiguration message, and/or BWP configuration information. Specifically, a CORSET configuration may include the following information/fields.

controlResourceSetId: indicates the ID of a CORESET.

frequencyDomainResources: indicates the frequency resources of the CORESET. The frequency resources of the CORESET are indicated by a bitmap in which each bit corresponds to an RBG (e.g., six (consecutive) RBs). For example, the most significant bit (MSB) of the bitmap corresponds to a first RBG. RBGs corresponding to bits set to 1 are allocated as the frequency resources of the CORESET.

duration: indicates the time resources of the CORESET. Duration indicates the number of consecutive OFDM symbols included in the CORESET. Duration has a value of 1 to 3.

cce-REG-MappingType: indicates a control channel element (CCE)-REG mapping type. Interleaved and non-interleaved types are supported.

interleaverSize: indicates an interleaver size.

pdcch-DMRS-ScramblingID: indicates a value used for PDCCH DMRS initialization.

When pdcch-DMRS-ScramblingID is not included, the physical cell ID of a serving cell is used.

precoderGranularity: indicates a precoder granularity in the frequency domain.

reg-BundleSize: indicates an REG bundle size.

tci-PresentInDCI: indicates whether a transmission configuration index (TCI) field is included in DL-related DCI.

tci-StatesPDCCH-ToAddList: indicates a subset of TCI states configured in pdcch-Config, used for providing quasi-co-location (QCL) relationships between DL RS(s) in an RS set (TCI-State) and PDCCH DMRS ports.

Further, the BS may transmit a PDCCH search space (SS) configuration to the UE (S504). The PDCCH SS configuration may be transmitted by higher-layer signaling (e.g., RRC signaling). For example, the RRC signaling may include, but not limited to, various types of signaling such as an RRC setup message, an RRC reconfiguration message, and/or BWP configuration information. While a CORESET configuration and a PDCCH SS configuration are shown in FIG. 5 as separately signaled, for convenience of description, the present disclosure is not limited thereto. For example, the CORESET configuration and the PDCCH SS configuration may be transmitted in one message (e.g., by one RRC signaling) or separately in different messages.

The PDCCH SS configuration may include information about the configuration of a PDCCH SS set. The PDCCH SS set may be defined as a set of PDCCH candidates monitored (e.g., blind-detected) by the UE. One or more SS sets may be configured for the UE. Each SS set may be a USS set or a CSS set. For convenience, PDCCH SS set may be referred to as "SS" or "PDCCH SS".

A PDCCH SS set includes PDCCH candidates. A PDCCH candidate is CCE(s) that the UE monitors to receive/detect a PDCCH. The monitoring includes blind decoding (BD) of PDCCH candidates. One PDCCH (candidate) includes 1, 2, 4, 8, or 16 CCEs according to an aggregation level (AL). One CCE includes 6 REGs. Each CORESET configuration is associated with one or more SSs, and each SS is associated with one CORESET configuration. One SS is defined based on one SS configuration, and the SS configuration may include the following information/fields.

searchSpaceId: indicates the ID of an SS.
  controlResourceSetId: indicates a CORESET associated with the SS.
  monitoringSlotPeriodicityAndOffset: indicates a periodicity (in slots) and offset (in slots) for PDCCH monitoring.
  monitoringSymbolsWithinSlot: indicates the first OFDM symbol(s) for PDCCH monitoring in a slot configured with PDCCH monitoring. The first OFDM symbol(s) for PDCCH monitoring is indicated by a bitmap with each bit corresponding to an OFDM symbol in the slot. The MSB of the bitmap corresponds to the first OFDM symbol of the slot. OFDM symbol(s) corresponding to bit(s) set to 1 corresponds to the first symbol(s) of a CORESET in the slot.
  nrofCandidates: indicates the number of PDCCH candidates (one of values 0, 1, 2, 3, 4, 5, 6, and 8) for each AL where AL={1, 2, 4, 8, 16}.
  searchSpaceType: indicates common search space (CSS) or UE-specific search space (USS) as well as a DCI format used in the corresponding SS type.

Subsequently, the BS may generate a PDCCH and transmit the PDCCH to the UE (S506), and the UE may monitor PDCCH candidates in one or more SSs to receive/detect the PDCCH (S508). An occasion (e.g., time/frequency resources) in which the UE is to monitor PDCCH candidates is defined as a PDCCH (monitoring) occasion. One or more PDCCH (monitoring) occasions may be configured in a slot.

Table 3 shows the characteristics of each SS.

TABLE 3

| Type | Search Space | RNTI | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

Table 4 shows DCI formats transmitted on the PDCCH.

TABLE 4

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or DL scheduling information. DCI format 2_0 is used to deliver dynamic slot format information (e.g., a dynamic slot format indicator (SFI)) to a UE, and DCI format 2_1 is used to deliver DL pre-emption information to a UE. DCI format 2_0 and/or DCI format 2_1 may be delivered to a corresponding group of UEs on a group common PDCCH which is a PDCCH directed to a group of UEs.

DCI format 0_0 and DCI format 1_0 may be referred to as fallback DCI formats, whereas DCI format 0_1 and DCI format 1_1 may be referred to as non-fallback DCI formats. In the fallback DCI formats, a DCI size/field configuration is maintained to be the same irrespective of a UE configuration. In contrast, the DCI size/field configuration varies depending on a UE configuration in the non-fallback DCI formats.

A CCE-to-REG mapping type is set to one of an interleaved type and a non-interleaved type.

Non-interleaved CCE-to-REG mapping (or localized CCE-to-REG mapping): 6 REGs for a given CCE are grouped into one REG bundle, and all of the REGs for the given CCE are contiguous. One REG bundle corresponds to one CCE.
  Interleaved CCE-to-REG mapping (or distributed CCE-to-REG mapping): 2, 3 or 6 REGs for a given CCE are grouped into one REG bundle, and the REG bundle is interleaved within a CORESET. In a CORESET including one or two OFDM symbols, an REG bundle includes 2 or 6 REGs, and in a CORESET including three OFDM symbols, an REG bundle includes 3 or 6 REGs. An REG bundle size is configured on a CORESET basis.

System Information Acquisition

A UE may acquire AS-/NAS-information in the SI acquisition process. The SI acquisition process may be applied to UEs in RRC_IDLE state, RRC_INACTIVE state, and RRC_CONNECTED state.

SI is divided into a master information block (MIB) and a plurality of system information blocks (SIBs). The SI except for the MIB may be referred to as remaining minimum system information (RMS) and other system information (OSI). RMSI corresponds to SIB1, and OSI refers to SIBs of SIB2 or higher other than SIB1. For details, reference may be made to the followings.

The MIB includes information/parameters related to reception of systemInformaitonBlockType1 (SIB1) and is transmitted on a PBCH of an SSB. MIB information may include the following fields.

pdcch-ConfigSIB1: Determines a common ControlResourceSet (CORESET), a common search space and necessary PDCCH parameters. If the field ssb-SubcarrierOffset indicates that SIB1 is absent, the field pdcch-ConfigSIB1 indicates the frequency positions where the UE may find SS/PBCH block with SIB1 or the frequency range where the network does not provide SS/PBCH block with SIB1.

ssb-SubcarrierOffset: Corresponds to kSSB which is the frequency domain offset between SSB and the overall resource block grid in number of subcarriers. The value range of this field may be extended by an additional most significant bit encoded within PBCH. This field may indicate that this cell does not provide SIB1 and that there is hence no CORESET #0 configured in MIB. In this case, the field pdcch-ConfigSIB1 may indicate the frequency positions where the UE may (not) find a SS/PBCH with a control resource set and search space for SIB1.

subCarrierSpacingCommon: Subcarrier spacing for SIB1, Msg.2/4 for initial access, paging and broadcast SI-messages. If the UE acquires this MIB on an FR1 carrier frequency, the value scs15or60 corresponds to 15 kHz and the value scs30or120 corresponds to 30 kHz. If the UE acquires this MIB on an FR2 carrier frequency, the value scs15or60 corresponds to 60 kHz and the value scs30or120 corresponds to 120 kHz.

In initial cell selection, the UE may determine whether there is a control resource set (CORESET) for a Type0-PDCCH common search space based on the MIB. The Type0-PDCCH common search space is a kind of a PDCCH search space, and is used to transmit a PDCCH scheduling an SI message. In the presence of a Type0-PDCCH common search space, the UE may determine (i) a plurality of consecutive RBs and one or more consecutive symbols in a CORESET and (ii) PDCCH occasions (i.e., time-domain positions for PDCCH reception), based on information (e.g., pdcch-ConfigSIB1) in the MIB. Specifically, pdcch-ConfigSIB1 is 8-bit information, (i) is determined based on the most significant bits (MSB) of 4 bits, and (ii) is determined based on the least significant bits (LSB) of 4 bits.

In the absence of any Type0-PDCCH common search space, pdcch-ConfigSIB1 provides information about the frequency position of an SSB/SIB1 and a frequency range free of an SSB/SIB1.

For initial cell selection, a UE may assume that half frames with SS/PBCH blocks occur with a periodicity of 2 frames. Upon detection of a SS/PBCH block, the UE determines that a control resource set for Type0-PDCCH common search space is present if $k_{SSB} \leq 23$ for FR1 (Frequency Range 1; Sub-6 GHz; 450 to 6000 MHz) and if $k_{SSB} \leq 11$ for FR2 (Frequency Range 2; mm-Wave; 24250 to 52600 MHz). The UE determines that a control resource set for Type0-PDCCH common search space is not present if $k_{SSB}>23$ for FR1 and if $k_{SSB}>11$ for FR2. $k_{SSB}$ represents a frequency/subcarrier offset between subcarrier 0 of SS/PBCH block to subcarrier 0 of common resource block for SSB. For FR2 only values up to 11 are applicable. $k_{SSB}$ may be signaled through the MIB.-SIB1 includes information related to the availability and scheduling (e.g., a transmission periodicity and an SI-window size) of the other SIBs (hereinafter, referred to as SIBx where x is an integer equal to or larger than 2). For example, SIB1 may indicate whether SIBx is broadcast periodically or provided by an UE request in an on-demand manner. When SIBx is provided in the on-demand manner, SIB1 may include information required for the UE to transmit an SI request. SIB1 is transmitted on a PDSCH, and a PDCCH scheduling SIB1 is transmitted in a Type0-PDCCH common search space. SIB1 is transmitted on a PDSCH indicated by the PDCCH.

SIBx is included in an SI message and transmitted on a PDSCH. Each SI message is transmitted within a time window (i.e., an SI-window) which takes place periodically.

Figure 6:
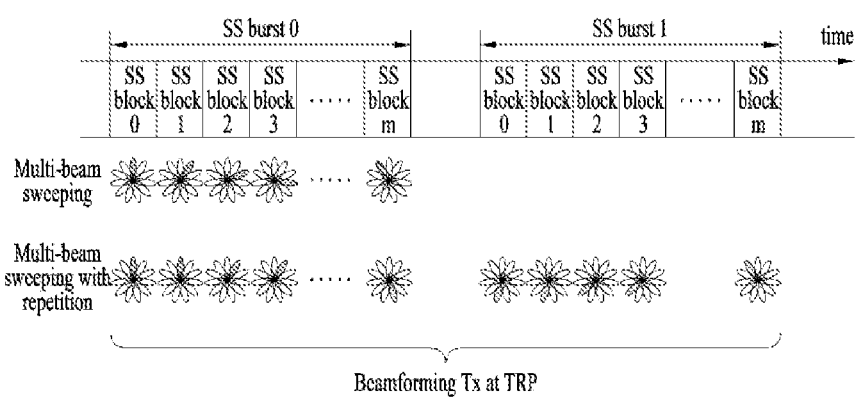
FIG. 6 illustrates exemplary multi-beam transmission of an SSB.

FIG. 6 illustrates exemplary multi-beam transmission of an SSB. Beam sweeping refers to changing the beam (direction) of a wireless signal over time at a transmission reception point (TRP) (e.g., a BS/cell) (hereinbelow, the terms beam and beam direction are interchangeably used). An SSB may be transmitted periodically by beam sweeping. In this case, SSB indexes are implicitly linked to SSB beams. An SSB beam may be changed on an SSB (index) basis. The maximum transmission number L of an SSB in an SSB burst set is 4, 8 or 64 according to the frequency band of a carrier. Accordingly, the maximum number of SSB beams in the SSB burst set may be given according to the frequency band of a carrier as follows.

For frequency range up to 3 GHz, Max number of beams=4

For frequency range from 3 GHz to 6 GHz, Max number of beams=8

For frequency range from 6 GHz to 52.6 GHz, Max number of beams=64

Without multi-beam transmission, the number of SS/PBCH block beams is 1.

When a UE attempts initial access to a BS, the UE may perform beam alignment with the BS based on an SS/PBCH block. For example, after SS/PBCH block detection, the UE identifies a best SS/PBCH block. Subsequently, the UE may transmit an RACH preamble to the BS in PRACH resources linked/corresponding to the index (i.e., beam) of the best SS/PBCH block. The SS/PBCH block may also be used in beam alignment between the BS and the UE after the initial access.

Figure 7:
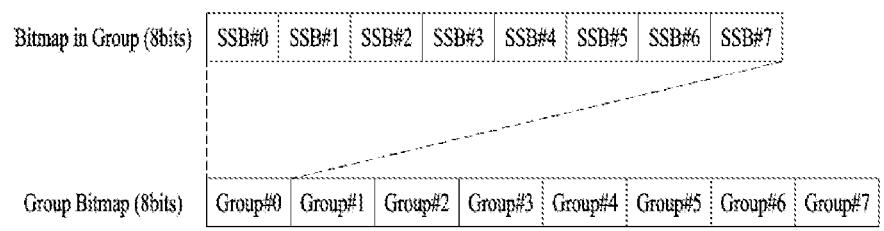
FIG. 7 illustrates an exemplary method of indicating an actually transmitted SSB.

FIG. 7 illustrates an exemplary method of indicating an actually transmitted SSB (SSB_tx). Up to L SS/PBCH blocks may be transmitted in an SS/PBCH block burst set, and the number/positions of actually transmitted SS/PBCH blocks may be different for each BS/cell. The number/positions of actually transmitted SS/PBCH blocks are used for rate-matching and measurement, and information about actually transmitted SS/PBCH blocks is indicated as follows.

If the information is related to rate-matching: the information may be indicated by UE-specific RRC signaling or remaining minimum system information (RMSI). The UE-specific RRC signaling includes a full bitmap (e.g., of length L) for frequency ranges below and above 6 GHz. The RMSI includes a full bitmap for a frequency range below 6 GHz and a compressed bitmap for a frequency range above 6 GHz, as illustrated. Specifically, the information about actually transmitted SS/PBCH blocks may be indicated by a group-bitmap (8 bits)+an in-group bitmap (8 bits). Resources (e.g., REs) indicated by the UE-specific RRC signaling or the RMSI may be reserved for SS/PBCH block transmission, and a PDSCH/PUSCH may be rate-matched in consideration of the SS/PBCH block resources.

If the information is related to measurement: the network (e.g., BS) may indicate an SS/PBCH block set to be measured within a measurement period, when the UE is in RRC connected mode. The SS/PBCH block set may be indicated for each frequency layer. Without an indication of an SS/PBCH block set, a default SS/PBCH block set is used. The default SS/PBCH block set includes all SS/PBCH blocks within the measurement period. An SS/PBCH block set may be indicated by a full bitmap (e.g., of length L) in RRC signaling. When the UE is in RRC idle mode, the default SS/PBCH block set is used.

Random Access Operation and Related Operation

When there is no PUSCH transmission resource (i.e., uplink grant) allocated by the BS, the UE may perform a random access operation. Random access of the NR system can occur 1) when the UE requests or resumes the RRC connection, 2) when the UE performs handover or secondary cell group addition (SCG addition) to a neighboring cell, 3) when a scheduling request is made to the BS, 4) when the BS indicates random access of the UE in PDCCH order, or 5) when a beam failure or RRC connection failure is detected.

The RACH procedure of LTE and NR consists of 4 steps of Msg1 (PRACH preamble) transmission from the UE, Msg2 (RAR, random access response) transmission from the BS, Msg3 (PUSCH) transmission from the UE, and Msg4 (PDSCH) transmission from the BS. That is, the UE transmits a physical random access channel (PRACH) preamble and receives an RAR as a response thereto. When the preamble is a UE-dedicated resource, that is, in the case of contention free random access (CFRA), the random access operation is terminated by receiving the RAR corresponding to the UE itself. If the preamble is a common resource, that is, in the case of contention based random access (CBRA), after the RAR including an uplink PUSCH resource and a RACH preamble ID (RAPID) selected by the UE is received, Msg3 is transmitted through a corresponding resource on the PUSCH. And after a contention resolution message is received on the PDSCH, the random access operation is terminated. In this case, a time and frequency resources to/on which the PRACH preamble signal is mapped/transmitted is defined as RACH occasion (RO), and a time and frequency resource to/on which the Msg3 PUSCH signal is mapped/transmitted is defined as PUSCH occasion (PO).

In Rel. 16 In NR and NR-U, a 2-step RACH procedure has been introduced, which is a reduced procedure for the 4-step RACH procedure. The 2-step RACH procedure is composed of MsgA (PRACH preamble+Msg3 PUSCH) transmission from the UE and MsgB (RAR+Msg4 PDSCH) transmission from the gNB.

Figure 8:
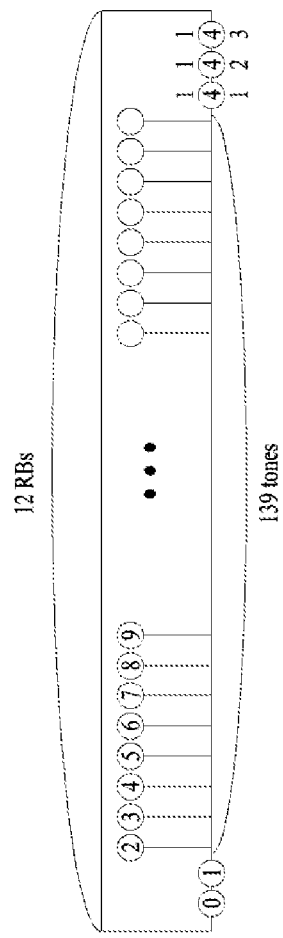
FIG. 8 illustrates an example of PRACH transmission in the NR system.

The PRACH format for transmitting the PRACH preamble in the NR system consists of a format composed of a length 839 sequence (named as a long RACH format for simplicity) and a format composed of a length 139 sequence (named as a short RACH format for simplicity). For example, in frequency range 1 (FR1), the sub-carrier spacing (SCS) of the short RACH format is defined as 15 or 30 kHz. Also, as shown in FIG. 8, RACH can be transmitted on 139 tones among 12 RBs (144 REs). In FIG. 8, 2 null tones are assumed for the lower RE index and 3 null tones are assumed for the upper RE index, but the positions may be changed.

The above-mentioned short PRACH format comprises values defined in Table 5. Here, $\mu$ is defined as one of $\{0, 1, 2, 3\}$ according to the value of subcarrier spacing. For example, in the case of 15 kHz subcarrier spacing, $\mu$ is 0. In the case of 30 kHz subcarrier spacing, $\mu$ is 1. Table 5 shows Preamble formats for $L_{RA}=139$ and $\Delta f^{RA}=15\times 2^{\mu}$ kHz, where $\mu \in \{0, 1, 2, 3\}$, $K=T_s/T_c=64$.

TABLE 5

| Format | $L_{RA}$ | $\Delta f^{RA}$ | $N_u$ | $N_{CP}^{RA}$ |
|---|---|---|---|---|
| A1 | 139 | $15 \times 2^{\mu}$ kHz | $2 \times 2048\kappa \times 2^{-\mu}$ | $288\kappa \times 2^{-\mu}$ |
| A2 | 139 | $15 \times 2^{\mu}$ kHz | $4 \times 2048\kappa \times 2^{-\mu}$ | $576\kappa \times 2^{-\mu}$ |
| A3 | 139 | $15 \times 2^{\mu}$ kHz | $6 \times 2048\kappa \times 2^{-\mu}$ | $864\kappa \times 2^{-\mu}$ |
| B1 | 139 | $15 \times 2^{\mu}$ kHz | $2 \times 2048\kappa \times 2^{-\mu}$ | $216\kappa \times 2^{-\mu}$ |
| B2 | 139 | $15 \times 2^{\mu}$ kHz | $4 \times 2048\kappa \times 2^{-\mu}$ | $360\kappa \times 2^{-\mu}$ |
| B3 | 139 | $15 \times 2^{\mu}$ kHz | $6 \times 2048\kappa \times 2^{-\mu}$ | $504\kappa \times 2^{-\mu}$ |
| B4 | 139 | $15 \times 2^{\mu}$ kHz | $12 \times 2048\kappa \times 2^{-\mu}$ | $936\kappa \times 2^{-\mu}$ |
| C0 | 139 | $15 \times 2^{\mu}$ kHz | $2048\kappa \times 2^{-\mu}$ | $1240\kappa \times 2^{-\mu}$ |
| C2 | 139 | $15 \times 2^{\mu}$ kHz | $4 \times 2048\kappa \times 2^{-\mu}$ | $2048\kappa \times 2^{-\mu}$ |

The BS can announce which PRACH format can be transmitted as much as a specific duration at a specific timing through higher layer signaling (RRC signaling or MAC CE or DCI, etc.) and how many ROs (RACH occasions or PRACH occasions) are in the slot. Table 6 shows a part of PRACH configuration indexes that can use A1, A2, A3, B1, B2, B3.

TABLE 6

| PRACH Configuration Index | Preamble format | $n_{SFN}$mod x = y | | Subframe number | Starting symbol | Number of PRACH slots within a subframe | $N_t^{RA, slot}$ number of time-domain PRACH occasions within a PRACH slot | $N_{dur}^{RA}$, PRACH duration |
|---|---|---|---|---|---|---|---|---|
| | | x | y | | | | | |
| 81 | A1 | 1 | 0 | 4, 9 | 0 | 1 | 6 | 2 |
| 82 | A1 | 1 | 0 | 7, 9 | 7 | 1 | 3 | 2 |
| 100 | A2 | 1 | 0 | 9 | 9 | 1 | 1 | 4 |
| 101 | A2 | 1 | 0 | 9 | 0 | 1 | 3 | 4 |
| 127 | A3 | 1 | 0 | 4, 9 | 0 | 1 | 2 | 6 |
| 128 | A3 | 1 | 0 | 7, 9 | 7 | 1 | 1 | 6 |
| 142 | B1 | 1 | 0 | 4, 9 | 2 | 1 | 6 | 2 |
| 143 | B1 | 1 | 0 | 7, 9 | 8 | 1 | 3 | 2 |
| 221 | A1/B1 | 1 | 0 | 4, 9 | 2 | 1 | 6 | 2 |
| 222 | A1/B1 | 1 | 0 | 7, 9 | 8 | 1 | 3 | 2 |
| 235 | A2/B2 | 1 | 0 | 4, 9 | 0 | 1 | 3 | 4 |
| 236 | A2/B2 | 1 | 0 | 7, 9 | 6 | 1 | 2 | 4 |
| 251 | A3/B3 | 1 | 0 | 4, 9 | 0 | 1 | 2 | 6 |
| 252 | A3/B3 | 1 | 0 | 7, 9 | 2 | 1 | 2 | 6 |

Referring to Table 6, information about the number of ROs defined in a RACH slot for each preamble format (i.e., $N_t^{RA,\ slot}$: number of time-domain PRACH occasions within a PRACH slot), and the number of OFDM symbols occupied by each PRACH preamble for the preamble format (i.e., $N_{dur}^{RA}$, PRACH duration) can be known. In addition, by indicating the starting symbol of the first RO, information about the time at which the RO starts in the RACH slot can also be provided. FIG. 9 shows the configuration of the ROs in the RACH slot according to the PRACH configuration index values shown in Table 6.

Beam Management

Beam management (BM) procedures defined in new radio (NR) will now be described. The BM procedures as a layer 1 (L1)/layer 2 (L2) procedures for acquiring and maintaining a set of beams of a BS (e.g., a gNB, a TRP, etc.) and/or a terminal (e.g., UE), that may be used for DL and UL transmission/reception, may include the following procedures and terms.

Beam measurement: Operation of measuring characteristics of a received beamforming signal by a gNB or a UE.

Beam determination: Operation of selecting a transmit (Tx) beam/receive (Rx) beam of the gNB and the UE by the gNB and the UE.

Beam sweeping: Operation of covering a spatial region using a Tx and/or Rx beam for a predetermined time interval in a predetermined manner.

Beam report: Operation of reporting information of a beamformed signal based on beam measurement.

For beam measurement, a synchronization signal (SS) block (or SS/physical broadcast channel (PBCH) block) (SSB) or a channel state information reference signal (CSI-RS) is used on DL, and a sounding reference signal (SRS) is used on UL. In RRC_CONNECTED, the UE may measure a plurality of beams (or at least one beam) of a cell and average measurement results (reference signal received power (RSRP), reference signal received quality (RSRQ), signal-to-interference-plus-noise ratio (SINR), etc.) to derive cell quality. Therethrough, the UE may be configured to consider a subset of detected beam(s).

Beam measurement-related filtering occurs at two different levels (a physical layer deriving beam quality and an RRC level deriving cell quality in multiple beams). Cell quality from beam measurement is derived in the same manner for serving cell(s) and non-serving cell(s).

Figure 10:
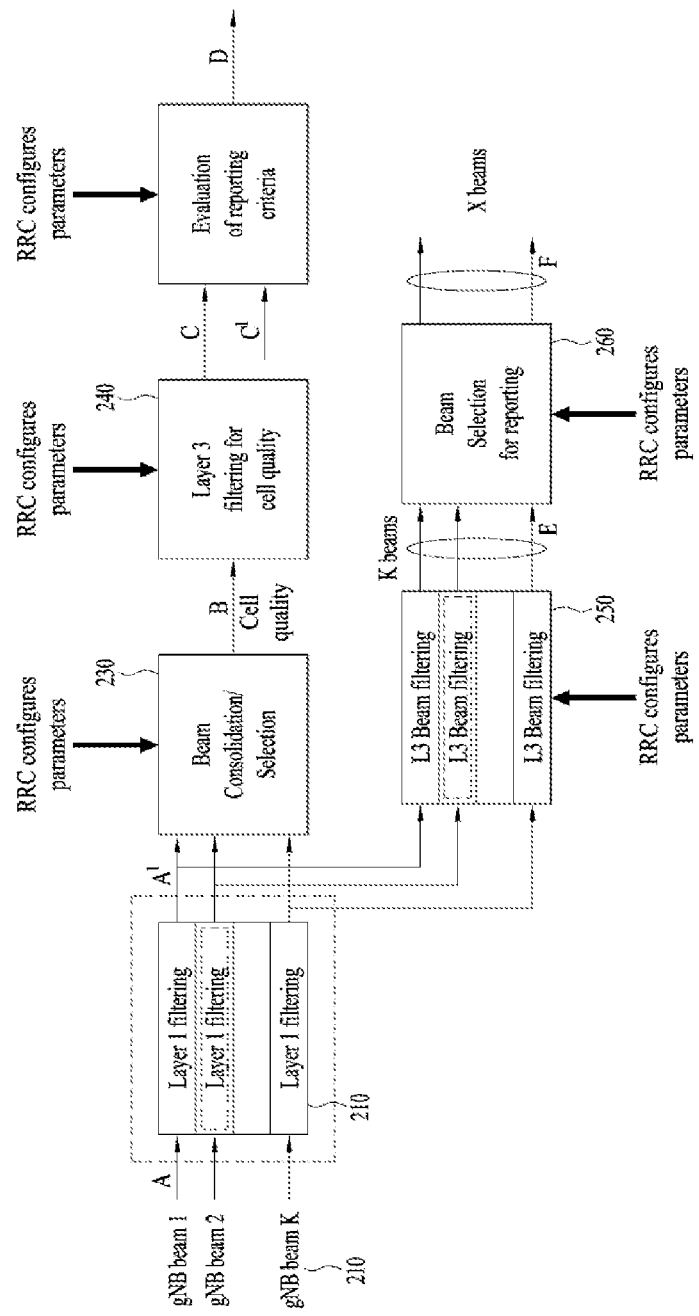
FIG. 10 illustrates an example of a beam related measurement model.

If the UE is configured to report measurement results for specific beam(s) by the gNB, a measurement report includes measurement results for X best beams. The beam measurement results may be reported as L1-RSRP. In FIG. 10, K beams (gNB beam 1, gNB beam 2, . . . , gNB beam k) 210 are configured for L3 mobility by the gNB and correspond to measurement of an SSB or a CSI-RS resource detected by the UE in L1. In FIG. 10, layer 1 filtering 220 refers to filtering of internal layer 1 of input measured at a point A. Beam consolidation/selection 230 is consolidated (or integrated) such that beam specific measurement derives cell quality. Layer 3 filtering 240 for cell quality refers to filtering performed for measurement provided at a point B. The UE evaluates reporting criteria whenever a new measurement result is reported at least at points C and C1. D corresponds to measurement report information (message) transmitted through a radio interface. L3 beam filtering 250 performs filtering for measurement provided at point A1 (beam specific measurement). Beam selection 260 for beam reporting selects X measurement values from measurement provided at a point E. F indicates beam measurement information included in a measurement report (transmitted) through the radio interface.

The BM procedures may be divided into (1) a DL BM procedure using an SS/PBCH block or a CSI-RS and (2) a UL BM procedure using an SRS. Further, each BM procedure may include Tx beam sweeping for determining a Tx beam and Rx beam sweeping for determining an Rx beam.

DL BM Procedure

The DL BM procedure will now be described first. The DL BM procedure may include (1) transmission of beamformed DL RS s (e.g., a CSI-RS or an SS block (SSB)) of the gNB and (2) beam reporting of the UE. Here, beam reporting may include preferred DL RS identifier(s) (ID(s)) and L1-RSRP corresponding thereto. The DL RS ID may be an SSB resource indicator (SSBRI) or a CSI-RS resource indicator (CRI).

Figure 11:
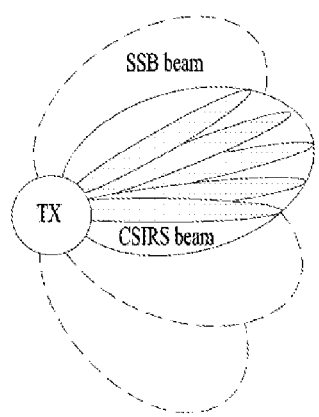
FIG. 11 illustrates an example of a Tx beam related to a DL beam management procedure.

FIG. 11 illustrates an example of a Tx beam related to the DL BM procedure.

As illustrated in FIG. 11, an SSB beam and a CSI-RS beam may be used for beam measurement. Here, a measurement metric is L1-RSRP per resource/block. An SSB may be used for coarse beam measurement, and a CSI-RS may be used for fine beam measurement. The SSB may be used for both Tx beam sweeping and Rx beam sweeping. Rx beam sweeping using the SSB may be performed while the UE changes an Rx beam for the same SSBRI across a plurality of SSB bursts. In this case, one SS burst includes one or more SSBs, and one SS burst set includes one or more SSB bursts.

DL BM Procedure Using SSB

Figure 12:
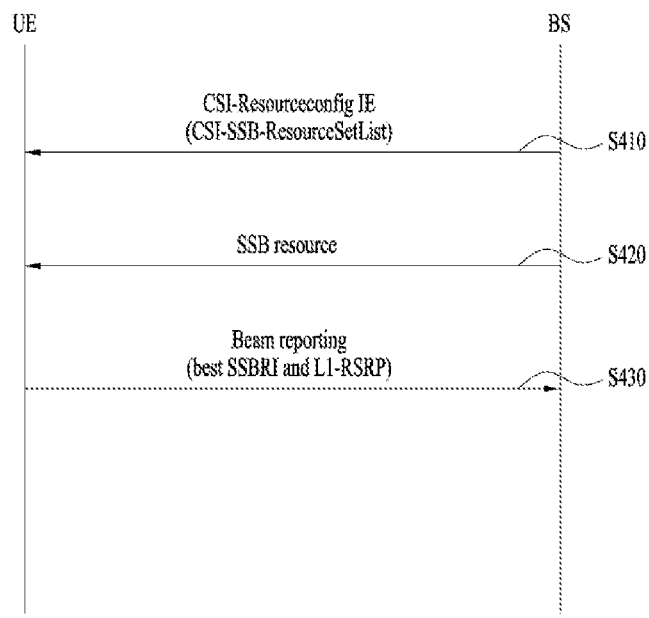
FIG. 12 is a flowchart illustrating an example of a DL beam management procedure using SSB.

FIG. 12 is a flowchart illustrating an example of a DM BM procedure using an SSB.

A configuration for beam reporting using the SSB is performed in an RRC connected state (or an RRC connected mode) during CSI/beam configuration. As in a CSI-ResourceConfig IE of Table 7 below, a BM configuration using the SSB is not separately defined, and the SSB is configured like a CSI-RS resource. Table 7 shows an example of the CSI-ResourceConfig IE.

TABLE 7

```
-- ASN1START
-- TAG-CSI-RESOURCECONFIG-START
CSI-ResourceConfig ::=          SEQUENCE {
    csi-ResourceConfigId        CSI-ResourceConfigId,
    csi-RS-ResourceSetList      CHOICE {
      nzp-CSI-RS-SSB              SEQUENCE {
        nzp-CSI-RS-ResourceSetList    SEQUENCE (SIZE (1..maxNrofNZP-CSI-RS-ResourceSetsPerConfig)) OF NZP-CSI-RS-ResourceSetId OPTIONAL.
        csi-SSB-ResourceSetList       SEQUENCE (SIZE (1..maxNrofCSI-SSB-ResourceSetPerConfig)) OF CSI-SSB-ResourceSetId   OPTIONAL
      }.
      csi-IM-ResourceSetList        SEQUENCE (SIZE (1..maxNrofCSI-IM-ResourceSetsPerConfig)) OF CSI-IM-ResourceSetId
    }.
```

TABLE 7-continued

| bwp-Id | BWP-Id, |
|---|---|
| resourceType | ENUMERATED { aperiodic. semiPersistent. periodic } |
| ... | |

}
-- Tag-CSI-RESOURCECONFIGTOADDMOD-STOP
-- ASN1STOP

In Table 7, a csi-SSB-ResourceSetList parameter indicates a list of SSB resources used for BM and reporting in one resource set. The UE receives a CSI-ResourceConfig IE which includes CSI-SSB-ResourceSetList including SSB resources used for BM from the gNB (S410).

Here, an SSB resource set may be configured as {SSBx1, SSBx2, SSBx3, SSBx4, . . . }. SSB indexes may be defined from 0 to 63. The UE receives the SSB resources from the gNB based on CSI-SSB-ResourceSetList (S420). When CSI-RS reportConfig related to reporting for an SSBRI and an L1-RSRP is configured, the UE (beam-)reports the best SSBRI and an L1-RSRP corresponding thereto to the gNB (S430). That is, when reportQuantity of the CSI-RS reportConfig IE is configured as ssb-Index-RSRP', the UE reports the best SSBRI and the L1-RSRP corresponding thereto to the gNB. When a CSI-RS resource is configured in the same OFDM symbol(s) as an SS/PBCH block (SSB) and 'QCL-TypeD' is applicable, the UE may assume that a CSI-RS and the SSB are quasi co-located (QCLed) in terms of 'QCL-TypeD'. Here, QCL-TypeD may mean that antenna ports are QCLed in terms of a spatial Rx parameter. When the UE receives a plurality of DL antenna ports which is in a QCL-Type D relationship, the same Rx beam may be applied. The UE does not expect that the CSI-RS will be configured on an RE overlapped with an RE of the SSB.

DL BM Procedure Using CSI-RS

When the UE is configured with NZP-CSI-RS-ResourceSet in which (higher layer parameter) repetition is set to 'ON', the UE may assume that at least one CSI-RS resource in NZP-CSI-RS-ResourceSet is transmitted through the same DL spatial domain transmission filter. That is, at least one CSI-RS resource in NZP-CSI-RS-ResourceSet is transmitted through the same Tx beam. Here, at least one CSI-RS resource in NZP-CSI-RS-ResourceSet may be transmitted in different OFDM symbols or in different frequency regions (i.e., in FDM). The case in which the at least one CSI-RS resource is subjected to FDM is the case of a multi-panel UE. When repetition is set to 'ON', this is related to an Rx beam sweeping procedure of the UE. The UE does not expect to receive different periodicities in periodicityAndOffset on all CSI-RS resources in NZP-CSI-RS-ResourceSet. If repetition is set to 'OFF', the UE does not assume that at least one CSI-RS resource in NZP-CSI-RS-ResourceSet is transmitted through the same DL spatial domain transmission filter. That is, at least one CSI-RS resource in NZP-CSI-RS-ResourceSet is transmitted through different Tx beams. When repetition is set to 'OFF', this is related to a Tx beam sweeping procedure of the gNB. The repetition parameter may be configured only for an L1 RSRP and CSI-RS resource sets associated with CSI-ReportConfig having a report of 'No Report (or None)'.

If the UE is configured with CSI-ReportConfig in which reportQuantity is set to 'cri-RSRP' or 'none', and CSI-ResourceConfig (higher layer parameter resourcesForChannelMeasurement) for channel measurement does not include a higher layer parameter 'trs-Info' and includes NZP-CSI-RS-ResourceSet configured as a higher layer parameter 'repetition' (repetition=ON), the UE may be configured only with the same number of ports (one port or two ports) having a higher layer parameter 'nrofPorts' for all CSI-RS resources in NZP-CSI-RS-ResourceSet. Specifically, use of a CSI-RS will now be described. If the repetition parameter is configured and TRS_info is not configured in a specific CSI-RS resource set, the CSI-RS is used for BM. If the repetition parameter is not configured and TRS_info is configured, the CSI-RS is used for a tracking reference signal (TRS). If the repetition parameter is not configured and TRS_info is not configured, the CSI-RS is used for CSI acquisition.

Figure 13:
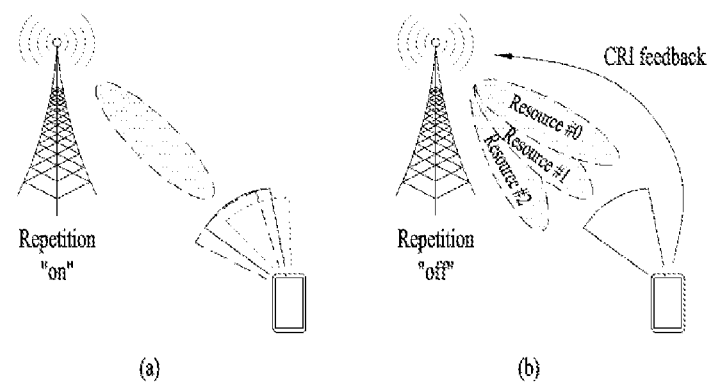
FIG. 13 illustrates an example of a DL beam management procedure using CSI-RS.

FIG. 13 illustrates an example of a DL BM procedure using a CSI-RS.

FIG. 13a illustrates an Rx beam determination (or refinement) procedure of a UE, and FIG. 13b illustrates a Tx beam determination procedure of a gNB. In addition, FIG. 5a shows the case in which a repetition parameter is set to 'ON', FIG. 5b shows the case in which the repetition parameter is set to 'OFF'.

Figure 14:
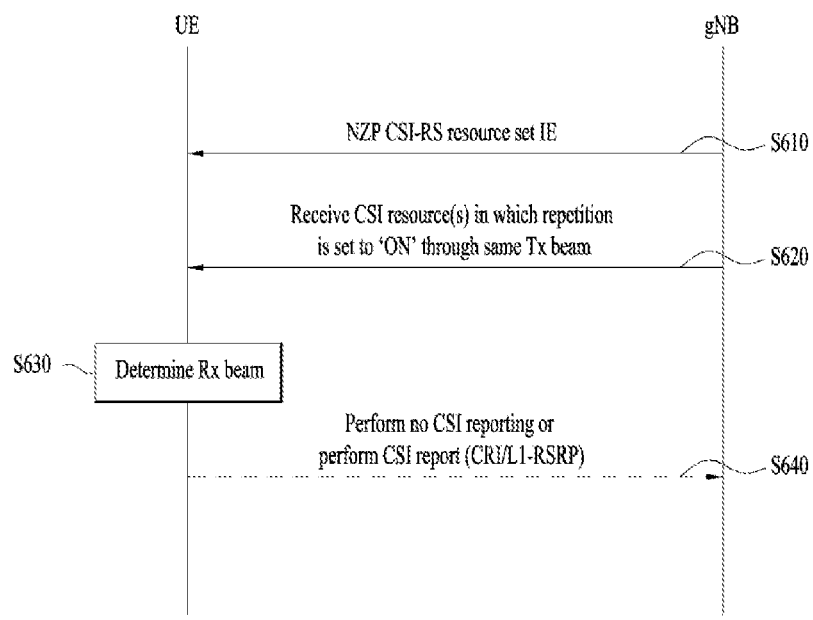
FIG. 14 is a flowchart illustrating an example of a Rx beam determination process of a terminal.

FIG. 14 is a flowchart illustrating an example of an Rx beam determination process of a UE.

The Rx beam determination process of the UE will be described with reference to FIG. 13a and FIG. 14.

The UE receives an NZP CSI-RS resource set IE including a higher layer parameter 'repetition' from the gNB through RRC signaling (S610). Here, the repetition parameter is set to 'ON'. The UE repeatedly receives resource(s) in a CSI-RS resource set in which the repetition parameter is set to 'ON' in different OFDM symbols through the same Tx beam (or DL spatial domain transmission filter) of the gNB (S620). Therethrough, the UE determines an Rx beam thereof (S630). Here, the UE performs no CSI report or transmits a CSI report including a CRI/L1-RSRP to the gNB (S640). In this case, reportQuantity of a CSI report configuration may be set to 'No report (or None)' or 'CRI+L1-RSRP'. That is, when repetition is set to 'ON', the UE may omit the CSI report or report ID information (CRI) about a preferred beam related to a beam pair and a quality value (L1-RSRP) corresponding thereto.

Figure 15:
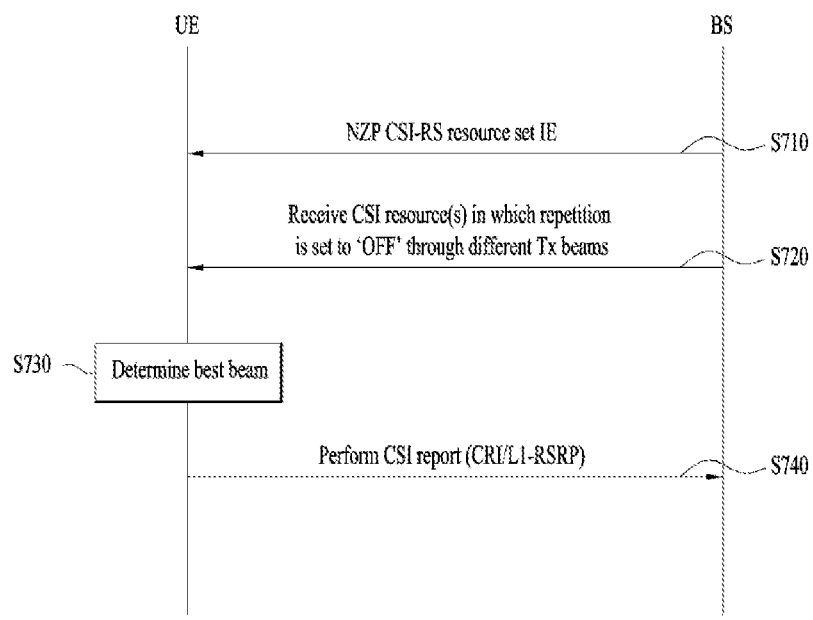
FIG. 15 is a flowchart illustrating an example of a transmission beam determination process of a base station.

FIG. 15 is a flowchart illustrating an example of a Tx beam determination process of a gNB.

The Tx beam determination process of the gNB will now be described with reference to FIGS. 13b and 15.

The UE receives an NZP CSI-RS resource set IE including a higher layer parameter 'repetition' from the gNB through RRC signaling (S710). Here, the repetition parameter is set to 'OFF' and is related to a Tx beam sweeping procedure of the gNB. The UE receives resources in a CSI-RS resource set in which the repetition parameter is set to 'OFF' through different Tx beams (DL spatial domain transmission filters) of the gNB (S720).

Then, the UE selects (or determines) the best beam (S740) and reports an ID of the selected beam and related quality information (e.g., L1-RSRP) to the gNB (S740). In this case, reportQuantity of a CSI report configuration may be set to 'CRI+L1-RSRP'. That is, when a CSI-RS is transmitted for BM, the UE reports a CRI and an L1-RSRP related thereto to the gNB.

Figure 16:
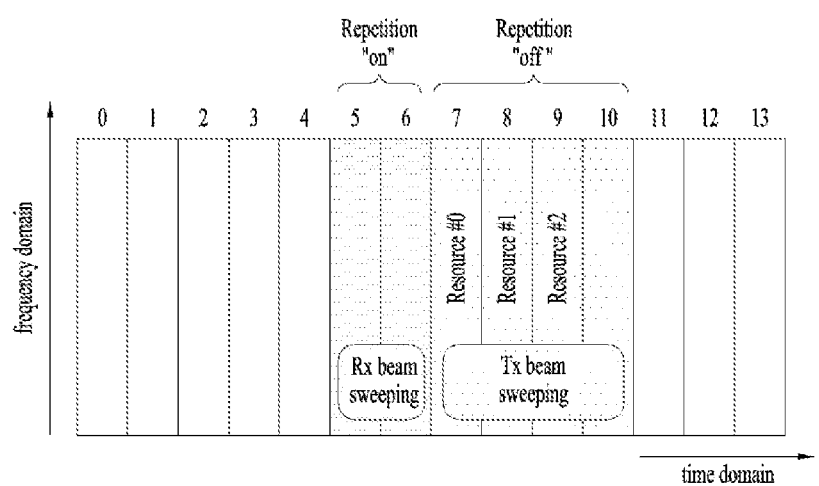
FIG. 16 illustrates an example of resource allocation in time and frequency domains related to the operation of FIG. 13.

FIG. 16 is a diagram illustrating an example of resource allocation in the time and frequency domains related to the operation of FIG. 13. That is, it may be seen that, when the repetition parameter in the CSI-RS resource set is set to 'ON', a plurality of CSI-RS resources is repeatedly used by applying the same Tx beam and, when the repetition parameter in the CSI-RS resource set is set to 'OFF', different CSI-RS resources are transmitted through different Tx beams.

The above-described contents (the 3GPP system, the frame structure, the NR system, etc.) may be applied in combination with methods proposed in various embodiments to be described later or may be supplemented to clarify the technical features of the methods proposed in various embodiments. In this document, '/' means 'and', 'or', or 'and/or' depending on context.

The NR UE supports beamforming-based reception in DL reception. That is, the UE receives a DL signal using a specific beam among a plurality of candidate beams. In particular, when the UE is in a connected mode, the gNB and the UE may maintain an optimal beam for the UE through a BM procedure. Accordingly, the gNB transmits a PDCCH/PDSCH using an optimal Tx beam suitable for the UE, and the UE receives the PDCCH/PDSCH using an optimal Rx beam.

In REL-17 NR, a method of reducing power consumption of the UE for a UE in a stationary or low mobility state is being discussed. In the case of the UE in a stationary state or the UE that moves only in a specific space such as an indoor space or a factory, there is a high possibility of maintaining an optimal beam for a long time. In the NR system for measuring a plurality of beams, there may be a big problem in that the UE wastes power in order to measure a plurality of beams, and the present disclosure proposes efficient BFD and beam recovery operations for the UE with low or limited mobility.

In the present disclosure, when a network designates a UE as a UE in a stationary state, a UE with low mobility, or a UE with limited mobility or when a UE determines that it is in a stationary state, a low mobility state, or a limited mobility state, a UE satisfying a specific condition designated by the gNB may perform relaxed RRM measurement or may not perform RRM measurement. For example, the UE may report current best SSB index measurement information to the gNB and, when the best SSB index indicated by the gNB is greater than or equal to a threshold, the UE may temporarily perform RRM measurement only for the best SSB index with respect to a target cell. In this case, the UE may temporarily stop RRM measurement with respect to a non-target cell.

Transmitter (e.g., BS or gNB)

In the present disclosure, the gNB may discern whether a UE is in a stationary state, a low mobility state, or a limited mobility state. For example, the gNB may distinguish the state of the UE according to subscriber information provided by a core network node. Alternatively, the gNB may check the state of the UE by continuously identifying the location of the UE through a positioning scheme or frequency of occurrence of handover.

When the UE is in the above state, the gNB may instruct the UE to perform relaxed RRM measurement or temporarily stop RRM measurement for a specific cell (e.g., an SCell or a neighboring cell).

Figure 17:
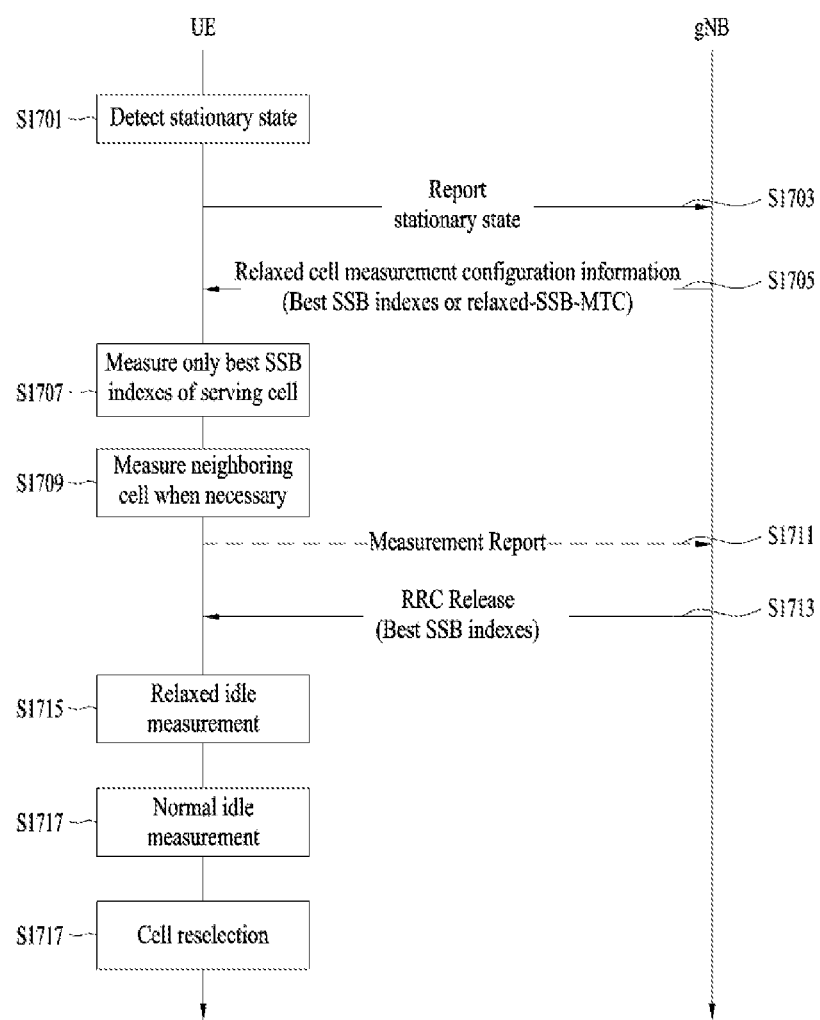
FIG. 17 illustrates an example of an RRM operation process.

FIG. 17 illustrates an example of an RRM operation process to which various embodiments are applicable.

In FIG. 17, the UE detects a stationary state (S1701). In this case, the UE in RRC_CONNECTED may report a stationary state, a low mobility state, or a limited mobility state to the gNB (S1703). In this case, the UE may report information about the best beam RS s in a current serving cell. For example, the UE may report one or plural best SSB indexes having the best RSRP/RSRQ measured in a current serving cell or one or plural SSB indexes having RSRP/RSRQ qualities greater than or equal to a threshold.

The gNB may configure relaxed RRM measurement for the UE through a state report of the UE or through subscriber information (S1705). The gNB may configure relaxed RRM measurement based on information about best quality SSB indexes reported by the UE. For example, the gNB may include information shown in Table 8 below in MeasObjectNR, which is measurement object configuration information.

TABLE 8

| MeasObjectNR ::= | SEQUENCE { |
|---|---|
| ssbFrequency | ARFCN-ValueNR |
| relax-ThreshSS | ThresholdNR |
| relax-ThreshCSIRS | ThresholdNR |
| relax-smtc-list | Relax-SSB-MTC } | relax-ThreshSS is a threshold value for an SSB for a relaxed cell measurement operation, and relax-ThreshCSIRS is a threshold value for a CSI-RS for the relaxed cell measurement operation.

relax-smtc-list includes one or more pieces of Relax-SSB-MTC configuration information. Each piece of Relax-SSB-MTC configuration information may be configured as shown in Table 9 below with respect to one or plural cells.

TABLE 9

| Relax-SSB-MTC ::= | SEQUENCE { |
|---|---|
| periodicityAndOffset | |
| duration | ENUMERATED {sf1. sf2. sf3. sf4, sf5}, |
| pci-List-r16 OPTIONAL | SEQUENCE (SIZE (1..maxNrofPCIsPerSMTC)) OF PhysCellId |
| bestssb-ToMeasure | SSB-set } |

When the UE moves from a stationary state or starts to move at a predetermined speed or more, relaxed RRM measurement of the present disclosure may be switched to normal RRM measurement. Alternatively, when the UE moves from a stationary state or starts to move at a predetermined speed or more, the UE may resume RRM measurement which has been stopped.

Here, bestssb-ToMeasure is an SSB set composed of one or plural SSB indexes that are preferentially selected when the UE performs relaxed measurement. When best SSB indexes selected by the gNB are in an actual best state, the UE performs relaxed measurement according to the Relax-SSB-MTC configuration information. In this case, the UE measures the SSB indexes selected by the gNB during a periodic time duration indicated by a combination of periodicityAndOffset and a duration. In this case, the gNB displays, in pci-List, one or plural cells that may be measured according to the configuration information.

The gNB may transmit an RRC Release message to a specific UE in an RRC_CONNECTED state to instruct the corresponding UE to transition to an RRC_IDLE state or an RRC_INACTIVE state (S1713). In this case, the gNB may indicate one or plural best SSB indexes to be used by the UE in the RRC_IDLE or RRC_INACTIVE state. The best SSB indexes may be indicated for each specific frequency or each specific cell. In addition, the gNB may indicate relax-ThreshSS for relaxed measurement. In this case, the specific cell may be a current serving cell or a neighboring cell other than the serving cell.

The gNB may broadcast relax-ThreshSS and information about a frequency/cell on which relaxed measurement is to be performed through system information for RRC_IDLE or RRC_INACTIVE UEs.

2. Receiver (e.g., Terminal or UE)

The UE performs relaxed measurement on a frequency or a cell included in MeasObjectNR or in the RRC Release message (S1707 and S1709). In this case, the included cell may be a serving cell or a neighboring cell (a non-serving cell).

If a measurement quality of the best SSB index in a current serving cell is greater than or equal to a specific threshold, the UE drives a timer and determines the measurement quality of the best SSB index as the measurement quality of the current serving cell for a predetermined time. Therefore, the UE does not need to measure non-best SSB indexes of the current serving cell when the timer is driving until the timer expires. In addition, there is no need to measure neighboring cells other than the serving cell (S1715).

If the measurement quality of the best SSB index in the serving cell is greater than or equal to a first threshold, the UE may report the measurement quality of the best SSB index to the gNB. In this case, the UE may report the measurement quality of the best SSB index or the measurement quality of the current serving cell. The gNB may instruct the UE to perform relaxed measurement after receiving the report or previously provide relaxed measurement configuration information before receiving the report so that the UE may start relaxed measurement. The gNB does not expect that the UE will receive SSBs other than non-best SSB indexes while the UE performs relaxed measurement.

If the measurement quality of the best SSB index in the serving cell is less than or equal to the first threshold, the UE may report the measurement quality of the best SSB index to the gNB. If the measurement quality of the best SSB index is less than or equal to a specific threshold, the UE starts to measure non-best SSB indexes by instruction by the gNB or determination of the UE (S1717). Accordingly, as in the prior art, the measurement quality of the serving cell is determined as an average value of measurement qualities of SSB index(es) greater than or equal to a second threshold.

If the measurement quality of the best SSB index in the serving cell is less than or equal to the first threshold, the UE starts to measure a neighboring cell rather than the serving cell. In this case, the UE measures only cell(s) and SSB indexes indicated by the gNB. A cell quality of this neighboring cell is determined as an average value of measurement qualities of the SSB indexes or a measured quality of the best SSB index. If the measurement result of the SSB index of the neighboring cell indicated by the gNB is less than or equal to a third threshold, the UE starts to perform quality measurement of a neighboring cell including SSB indexes of the neighboring cell which are not indicated.

The UE in an RRC_IDLE or RRC_INACTIVE state may perform a cell reselection process using the above measurement method (S1717). In cell reselection, the UE determines a cell having the best-ranked cell quality as a serving cell and camps on the serving cell. If a current serving cell is maintained as a result of performing the cell reselection process through relaxed measurement, the UE may report the current best SSB index to the gNB. If the best SSB index of the current serving cell is different from the best SSB index previously reported to the gNB, the UE may trigger an RACH to report the new best SSB index. In this case, the UE performs the RACH by selecting an RACH preamble mapped to the new best SSB index. If the best SSB index is reported through the RACH preamble to which the best SSB index is mapped or through MSG3 of the RACH, the UE and the gNB perform transmission/reception based on the best SSB index newly reported in the current serving cell. If the best SSB index of the current serving cell is the same as the best SSB index previously reported to the gNB, the UE does not report this and does not trigger the RACH.

Although only SSB measurement has been disclosed above, relaxed CSI-RS measurement may also be performed using the above process.

In an exemplary embodiment, the UE may perform relaxed SSB measurement as follows. The UE may also perform relaxed CSI-RS measurement in the following manner. X1, X2, T1, T2, a predetermined time, and predetermined level information, described below, are all fixed or may be configured by the gNB.

1) If a specific SSB index of the serving cell is included in bestssb-ToMeasure, and a measurement result of the SSB index is higher than the relax-ThreshSS value for a time X1 or the difference between a maximum measurement value and a minimum measured value for a time X2 is higher than a predetermined level, or if bestssb-ToMeasure is not included in configuration information, and a measurement result for the best SSB index of the serving cell is higher than the relax-ThreshSS value for the time X1 or the difference between the maximum measurement value and the minimum measurement value for the Time X2 is higher than a predetermined level, the UE stops measuring a neighboring cell for a time T1 or stops measuring non-best SSB indexes of a neighboring cell. In addition, the UE stops measurement of the current serving cell for a time T2 or stops measuring non-best SSB indexes of the serving cell. For example, the UE may stop RRM measurement for all or some of SSB indexes for a predetermined time with respect to neighboring cells having the same frequency as the serving cell or all neighboring cells and resume RRM measurement after a predetermined time.

A. Meanwhile, if there is a specific cell (e.g., a neighboring cell) indicated by MeasObjectNR, the UE does not stop measurement even under the above conditions and continues to perform measurement for the specific cell.

B. In this case, the UE determines the quality of the serving cell or the neighboring cell in one of the following ways with respect to currently measured SSB indexes. SSB indexes, which are not actually measured by relaxed measurement, are not included in cell quality determination below:

i. Cell quality is determined as an average of measurement qualities of all SSB indexes greater than or equal to relax-ThreshSS.

ii. Cell quality is determined as a measurement quality of the best SSB index greater than or equal to relax-ThreshSS.

iii. Cell quality is determined as an average of measurement qualities of all SSB indexes included in bestssb-ToMeasure.

iv. Cell quality is determined as a measurement quality of the best SSB index included in bestssb-ToMeasure.

2) If a specific SSB index of a serving cell is included in bestssb-ToMeasure, and a measurement result of the SSB index is lower than the relax-ThreshSS value for a time X1 or the difference between a maximum measurement value and a minimum measurement value for a time X2 is lower than a predetermined level, the UE starts measurement for all SSB indexes of the serving cell. In this case, the UE stops measurement of neighboring cells for a predetermined time. For example, the UE stops measurement for neighboring cells having the same frequency as the serving cell and all neighboring cells for a predetermined time.

A. Meanwhile, if there is a specific cell (e.g., a neighboring cell) indicated by MeasObjectNR, the UE does not stop measurement even under the above conditions and continues to perform measurement for the specific cell.

B. In this case, the UE determines the quality of the serving cell or the neighboring cell in one of the following ways.

i. Cell quality is determined as an average of measurement qualities of all SSB indexes greater than or equal to relax-ThreshSS.

ii. Cell quality is determined as a measurement quality of the best SSB index greater than or equal to relax-ThreshSS.

iii. Cell quality is determined as an average of measurement qualities of all SSB indexes included in bestssb-ToMeasure.

iv. Cell quality is determined as a measurement quality of the best SSB indexes included in bestssb-ToMeasure.

v. For a cell that does not have an SSB index that satisfies the above four conditions, cell quality is determined as an average of measurement qualities of all SSB indexes that are greater than or equal to a certain threshold set by the gNB as in the prior art.

3) If bestssb-ToMeasure is not included in configuration information, and measurement results of all SSB indexes of the serving cell are higher than the relax-ThreshSS value for a time X1 or the difference between a maximum measurement value and a minimum measurement value for the Time X2 is higher than a predetermined level, the UE starts measurement for neighboring cells. For example, the UE measures neighboring cells in the following order.

A. The UE measures a neighboring cell including PCI in configuration information. If the quality of the neighboring cell is less than or equal to a certain threshold, the UE starts measurement of neighboring cells using the same frequency as the serving cell or for all neighboring cells. In contrast, if the quality of a certain neighboring cell including the PCI in the configuration information is greater than or equal to a certain threshold, the UE measures only a neighboring cell included in the configuration information.

B. The UE measures a neighboring cell having the same frequency as the serving cell. If the quality of the neighboring cell is less than or equal to a certain threshold, the UE starts measurement of all neighboring cells regardless of frequency. If the quality of any neighboring cell having the same frequency as the serving cell is greater than or equal to a certain threshold, the UE measures only the neighboring cell having the same frequency as the serving cell.

C. In this case, the UE determines cell quality as an average of measurement qualities of all SSB indexes greater than or equal to a certain threshold set by the gNB as in the prior art. The UE in an RRC_CONNECTED state may transmit a measurement report periodically or according to a specific event. In this case, when the UE reports the measurement quality for a specific cell or a frequency as a measurement report, the UE may inform the gNB of in which manner the UE has determined cell quality.

When the UE in the RRC_CONNECTED state transitions to an RRC_IDLE or RRC_INACTIVE state, the gNB may indicate one or plural best SSB indexes. The best SSB indexes may be indicated for each specific frequency or specific cell. That is, the gNB may designate a frequency/cell/SSB index that is a target for performing relaxed measurement.

The UE that has transitioned to RRC_IDLE or RRC_INACTIVE performs cell selection first. When a cell selected by the UE is included in a cell indicated by the gNB in an RRC Release message, the UE performs relaxed measurement on the best SSB indexes for the selected cell. In relaxed measurement, the best SSB indexes are the same as bestssb-ToMeasure. The UE in the RRC_IDLE or RRC_INACTIVE state measures only a serving cell that is a currently selected cell by the relaxed measurement method described above or may measure neighboring cells according to the above conditions.

If the frequency/cell/SSB index, which is a target for performing relaxed measurement, is designated in the RRC Release message, the UE in the RRC_IDLE or RRC_INACTIVE state may report relaxed measurement to the gNB according to the following conditions.

When the UE is incapable of selecting a cell for a frequency/cell, which is a target for performing relaxed measurement, the UE stops relaxed measurement and performs normal measurement to select a cell other than the target. In this case, the UE may perform an RACH to report transition to normal measurement to the gNB.

When all target SSB index(es) in a target frequency/cell for performing relaxed measurement are less than or equal to a specific threshold, the UE may stop relaxed measurement and select a cell by performing normal measurement. In this case, the UE may perform the RACH to report transition to normal measurement to the gNB.

The report of the UE may include information as to whether the UE is in a stationary state or a mobility state. Upon receiving the report, the gNB may instruct the UE to re-designate a frequency/cell/SSB index, which is a target for performing relaxed measurement, or to release relaxed measurement and then transition to normal measurement.

Figure 18:
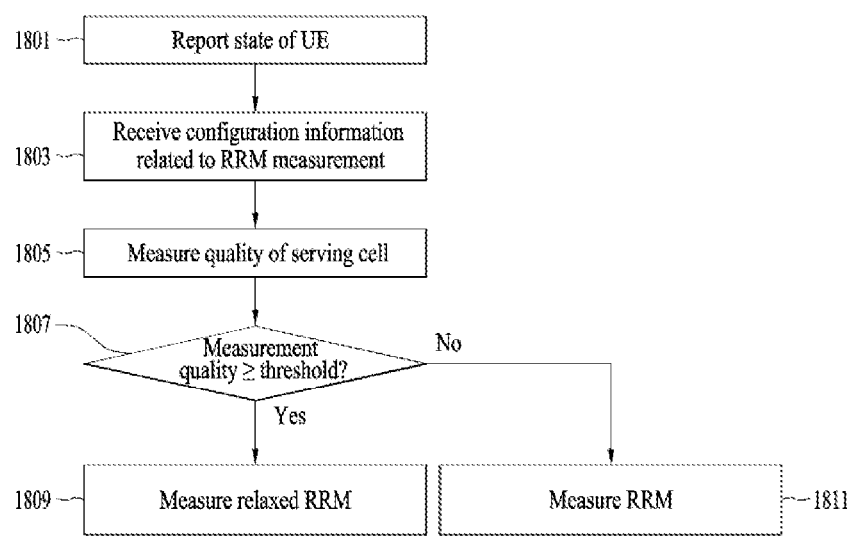
FIG. 18 illustrates a method of performing RRM by a user equipment in various embodiments of the present disclosure.

FIG. 18 is a diagram illustrating a method of performing RRM by a UE according to various embodiments.

The UE detects a stationary state. In this case, the UE may report information about a mobility state to the gNB (S1801). In this case, the UE may report information about the best beam RS in a current serving cell to the gNB. In an exemplary embodiment, the UE may report one or plural best SSB indexes having the best RSRP/RSRQ qualities measured in the current serving cell. In an exemplary embodiment, the UE may report one or plural SSB indexes having RSRP/RSRQ qualities greater than or equal to a threshold.

The UE receives configuration information related to RRM measurement from the gNB (S1803). The gNB may configure relaxed RRM measurement based on information about the SSB indexes reported by the UE.

The UE measures the quality of a serving cell (S1805).

If the measurement quality is greater than or equal to a specific threshold, the UE performs relaxed RRM measurement (S1807 and S1809). If the measurement quality of the best SSB index in the current serving cell is greater than or equal to the specific threshold, the UE drives a timer and determines the measurement quality of the best SSB index for a predetermined time as the measurement quality of the current serving cell. Performing relaxed RRM measurement means that the UE does not measure non-best SSB indexes of the current serving cell when the timer is driving until the timer expires. Alternatively, performing relaxed RRM measurement means that the UE does not measure neighboring cells other than the serving cell.

If the measurement quality is less than the specific threshold, the UE performs (normal) RRM measurement (S1807 and S1811).

The above procedure has described only a measurement method related to the relaxed SSB but may also be applied to relaxed CSI-RS measurement.

According to various embodiments, a UE with low mobility such as a stationary UE performs relaxed RRM measurement under a specific condition or does not perform RRM measurement for a predetermined time, thereby reducing power consumption of the UE under the specific condition.

Figure 19:
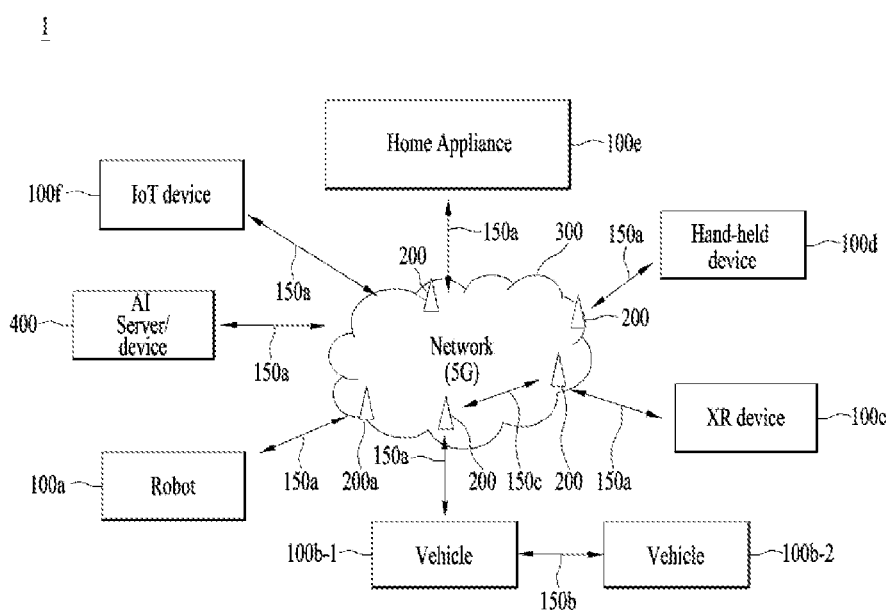
FIG. 19 to FIG. 22 illustrate a communication system 1 and wireless devices applied to the present disclosure.

FIG. 19 illustrates a communication system 1 applied to the present disclosure.

Referring to FIG. 19, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BS s/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 20:
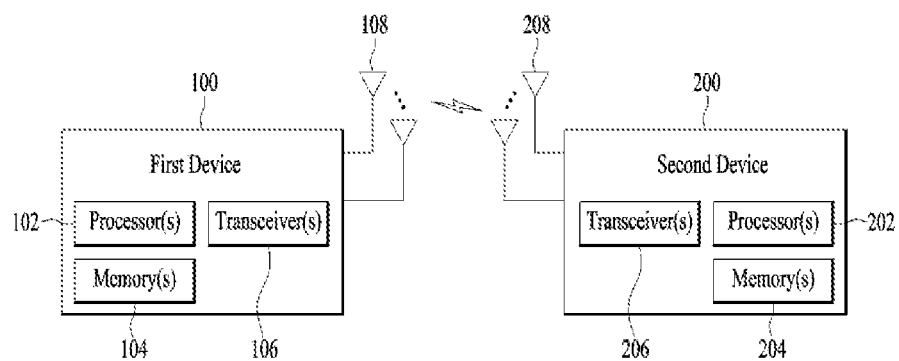

FIG. 20 illustrates wireless devices applicable to the present disclosure.

Referring to FIG. 20, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 19.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 21:
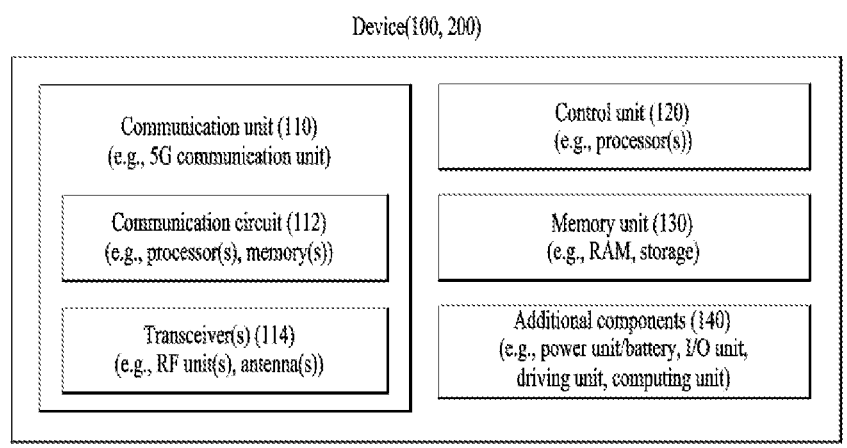

FIG. 21 illustrates another example of a wireless device applied to the present disclosure. The wireless device may be implemented in various forms according to a use-case/service (refer to FIG. 21).

Referring to FIG. 21, wireless devices 100 and 200 may correspond to the wireless devices 100 and 200 of FIG. 20 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 12. For example, the transceiver(s) 114 may include the one or more transceivers 106 and 206 and/or the one or more antennas 108 and 208 of FIG. 20. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 11), the vehicles (100b-1 and 100b-2 of FIG. 11), the XR device (100c of FIG. 11), the hand-held device (100d of FIG. 11), the home appliance (100e of FIG. 11), the IoT device (100f of FIG. 11), a digital broadcast terminal, a hologram device, a public safety device, an MTC device, a medicine device, a fintech device (or a finance device), a security device, a climate/environment device, the AI server/device (400 of FIG. 11), the BS s (200 of FIG. 11), a network node, etc. The wireless device may be used in a mobile or fixed place according to a use-example/service.

In FIG. 21, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 22:
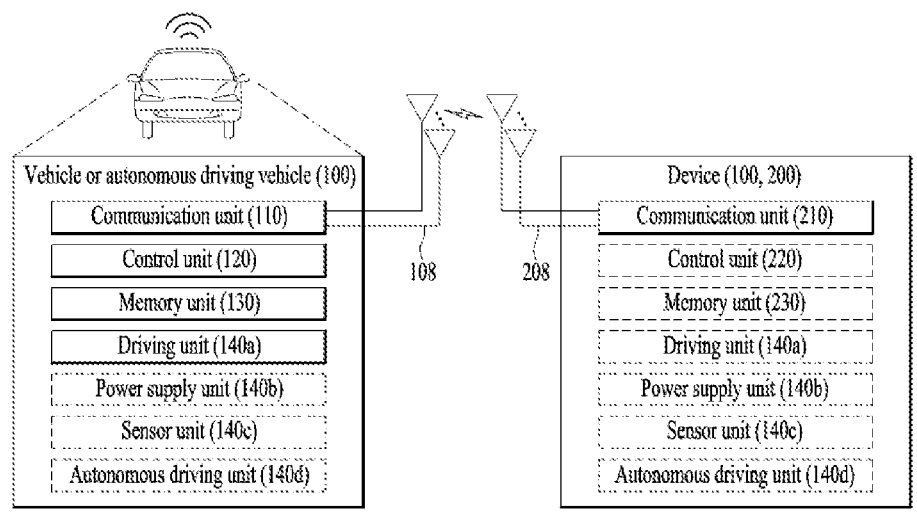

FIG. 22 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 22, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 21, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles.

In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Figure 23:
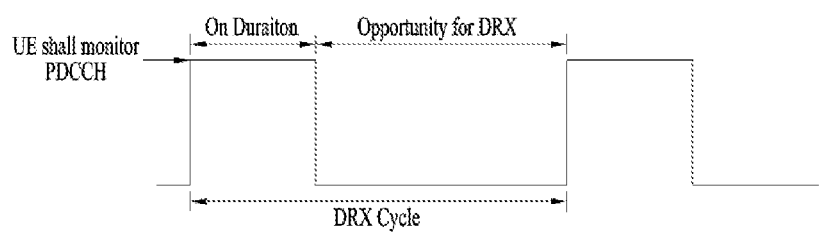
FIG. 23 illustrates an exemplary discontinuous reception (DRX) operation applied to the present disclosure.

FIG. 23 is a diagram illustrating a DRX operation of a UE according to an embodiment of the present disclosure.

The UE may perform a DRX operation in the afore-described/proposed procedures and/or methods. A UE configured with DRX may reduce power consumption by receiving a DL signal discontinuously. DRX may be performed in an RRC_IDLE state, an RRC_INACTIVE state, and an RRC_CONNECTED state. The UE performs DRX to receive a paging signal discontinuously in the RRC_IDLE state and the RRC_INACTIVE state. DRX in the RRC_CONNECTED state (RRC_CONNECTED DRX) will be described below.

Referring to FIG. 23, a DRX cycle includes an On Duration and an Opportunity for DRX. The DRX cycle defines a time interval between periodic repetitions of the On Duration. The On Duration is a time period during which the UE monitors a PDCCH. When the UE is configured with DRX, the UE performs PDCCH monitoring during the On Duration. When the UE successfully detects a PDCCH during the PDCCH monitoring, the UE starts an inactivity timer and is kept awake. On the contrary, when the UE fails in detecting any PDCCH during the PDCCH monitoring, the UE transitions to a sleep state after the On Duration. Accordingly, when DRX is configured, PDCCH monitoring/reception may be performed discontinuously in the time domain in the afore-described/proposed procedures and/or methods. For example, when DRX is configured, PDCCH reception occasions (e.g., slots with PDCCH SSs) may be configured discontinuously according to a DRX configuration in the present disclosure. On the contrary, when DRX is not configured, PDCCH monitoring/reception may be performed continuously in the time domain. For example, when DRX is not configured, PDCCH reception occasions (e.g., slots with PDCCH SSs) may be configured continuously in the present disclosure. Irrespective of whether DRX is configured, PDCCH monitoring may be restricted during a time period configured as a measurement gap.

Table 10 describes a DRX operation of a UE (in the RRC_CONNECTED state). Referring to Table 10, DRX configuration information is received by higher-layer signaling (e.g., RRC signaling), and DRX ON/OFF is controlled by a DRX command from the MAC layer. Once DRX is configured, the UE may perform PDCCH monitoring discontinuously in performing the afore-described/proposed procedures and/or methods, as illustrated in FIG. 23.

TABLE 10

| | Type of signals | UE procedure |
|---|---|---|
| 1$^{st}$ step | RRC signalling(MAC-CellGroupConfig) | Receive DRX configuration information |
| 2$^{nd}$ Step | MAC CE((Long) DRX command MAC CE) | Receive DRX command |
| 3$^{rd}$ Step | — | Monitor a PDCCH during an on-duration of a DRX cycle |

MAC-CellGroupConfig includes configuration information required to configure MAC parameters for a cell group. MAC-CellGroupConfig may also include DRX configuration information. For example, MAC-CellGroupConfig may include the following information in defining DRX.

Value of drx-OnDurationTimer: defines the duration of the starting period of the DRX cycle.

Value of drx-InactivityTimer: defines the duration of a time period during which the UE is awake after a PDCCH occasion in which a PDCCH indicating initial UL or DL data has been detected Value of drx-HARQ-RTT-TimerDL: defines the duration of a maximum time period until a DL retransmission is received after reception of a DL initial transmission.

Value of drx-HARQ-RTT-TimerDL: defines the duration of a maximum time period until a grant for a UL retransmission is received after reception of a grant for a UL initial transmission.

drx-LongCycleStartOffset: defines the duration and starting time of a DRX cycle.

drx-ShortCycle (optional): defines the duration of a short DRX cycle.

When any of drx-OnDurationTimer, drx-InactivityTimer, drx-HARQ-RTT-TimerDL, and drx-HARQ-RTT-TimerDL is running, the UE performs PDCCH monitoring in each PDCCH occasion, staying in the awake state.

What is claimed is:

1. A method of transmitting and receiving a signal by a user equipment (UE) in a wireless communication system, the method comprising:
   transmitting information about a mobility state of the UE;
   receiving configuration information related to cell measurement;
   measuring a quality of a serving cell with respect to a plurality of synchronization signal block (SSB) indexes of the serving cell; and
   performing radio resource management (RRM) measurement or relaxed RRM measurement based on the configuration information and a result of measurement,
   wherein performing the relaxed RRM measurement includes skipping performing the RRM measurement for a predetermined time with respect to remaining SSB indexes except for a specific SSB index of the serving cell or skipping the RRM measurement for the predetermined time with respect to a neighboring cell other than the serving cell, and
   wherein the configuration information includes information about the serving cell, the specific SSB index of the serving cell, the predetermined time, and the neighboring cell.

2. The method of claim 1,
   wherein the measurement quality of the serving cell is determined as an average of measurement qualities of partial SSB indexes having qualities greater than or equal to a first threshold as the result of measurement.

3. The method of claim 1,
   wherein the information about the mobility state of the UE includes one or more SSB indexes having best qualities measured by the serving cell or one or more SSB indexes having qualities greater than or equal to a threshold.

4. The method of claim 1,
   wherein the measurement quality of the serving cell is determined based on a measurement quality of the specific SSB index of the serving cell, which is greater than or equal to a second threshold.

5. The method of claim 4, further comprising:
reporting, to a base station (BS), the measurement quality of the serving cell determined based on the measurement quality of the specific SSB index of the serving cell, which is greater than or equal to the second threshold; and
receiving indication information instructing the UE to perform the relaxed RRM measurement from the BS, based on the reporting.

6. The method of claim 1, further comprising:
performing the RRM measurement with respect to the remaining SSB indexes of the serving cell, based on a measurement quality of the specific SSB index of the serving cell, which is less than a third threshold; and
performing measurement with respect to the neighboring cell other than the serving cell.

7. The method of claim 6,
wherein performing the measurement with respect to the neighboring cell comprises:
performing the RRM measurement with respect to a specific SSB index of the neighboring cell indicated by the BS; and
performing the RRM measurement with respect to remaining SSB indexes other than the specific SSB index of the neighboring cell, based on a measurement quality of the specific SSB index of the neighboring cell, which is less than a fourth threshold.

8. The method of claim 7,
wherein performing the measurement with respect to the neighboring cell comprises:
performing the RRM measurement with respect to neighboring cells having the same frequency as the serving cell; and
performing the RRM measurement with respect to all neighboring cells regardless of whether the neighboring cells have the same frequency as the serving cell, based on qualities of the neighboring cells which are less than a fifth threshold as the result of measurement.

9. A non-transitory computer readable medium in which program code for performing the method of claim 1 is recorded.

10. A user equipment (UE) operating in a wireless communication system, the UE comprising:
a transceiver; and
one or more processors connected to the transceiver,
wherein the one or more processors are configured to:
transmit information about a mobility state of the UE;
receive configuration information related to cell measurement;
measure a quality of a serving cell with respect to a plurality of synchronization signal block (SSB) indexes of the serving cell; and
perform radio resource management (RRM) measurement or relaxed RRM measurement based on the configuration information and a result of measurement,
wherein performing the relaxed RRM measurement by the processor includes skipping performing the RRM measurement for a predetermined time with respect to remaining SSB indexes except for a specific SSB index of the serving cell or skipping the RRM measurement for the predetermined time with respect to neighboring cells other than the serving cell, and
wherein the configuration information includes information about the serving cell, the specific SSB index of the serving cell, the predetermined time, and the neighboring cell.

11. The UE of claim 10,
wherein the measurement quality of the serving cell is determined as an average of measurement qualities of partial SSB indexes having qualities greater than or equal to a first threshold as the result of measurement.

12. The UE of claim 10,
wherein the information about the mobility state of the UE includes one or more SSB indexes having best qualities measured by the serving cell or one or more SSB indexes having qualities greater than or equal to a threshold.

13. The UE of claim 10,
wherein the measurement quality of the serving cell is determined based on a measurement quality of the specific SSB index of the serving cell, which is greater than or equal to a second threshold.

14. The UE of claim 13,
wherein the processors are configured to:
report, to a base station (BS), the measurement quality of the serving cell determined based on the measurement quality of the specific SSB index of the serving cell, which is greater than or equal to the second threshold; and
receive indication information instructing the UE to perform the relaxed RRM measurement from the BS, based on the reporting.

15. The UE of claim 10,
wherein the processors are configured to:
perform the RRM measurement with respect to the remaining SSB indexes of the serving cell, based on a measurement quality of the specific SSB index of the serving cell, which is less than a third threshold; and
perform measurement with respect to the neighboring cell other than the serving cell.

* * * * *